(12) United States Patent
Pletcher

(10) Patent No.: US 8,399,535 B2
(45) Date of Patent: Mar. 19, 2013

(54) POLYMER [[S]] COMPOSITIONS INCLUDING AN ANTIOXIDANT

(75) Inventor: Dirk Pletcher, Walkerton, IN (US)

(73) Assignee: Zimmer, Inc., Warsaw, IN (US)

( * ) Notice: Subject to any disclaimer, the term of this patent is extended or adjusted under 35 U.S.C. 154(b) by 0 days.

(21) Appl. No.: 12/813,401

(22) Filed: Jun. 10, 2010

(65) Prior Publication Data

US 2011/0306698 A1  Dec. 15, 2011

(51) Int. Cl.
C08K 5/51 (2006.01)
C08K 5/524 (2006.01)
A61F 2/30 (2006.01)

(52) U.S. Cl. ............ 522/75; 522/161; 522/76; 524/128; 526/352; 623/23.58

(58) Field of Classification Search .................. 524/128; 522/75, 161, 76; 526/352; 623/23.58
See application file for complete search history.

(56) References Cited

U.S. PATENT DOCUMENTS

| | | | |
|---|---|---|---|
| 5,308,549 A * | 5/1994 | Laermer et al. | 252/399 |
| 5,559,167 A * | 9/1996 | Mahood | 523/136 |
| 5,577,368 A | 11/1996 | Hamilton et al. | |
| 5,753,182 A | 5/1998 | Higgins | |
| 5,827,904 A | 10/1998 | Hahn | |
| 5,879,400 A | 3/1999 | Merrill et al. | |
| 6,017,975 A | 1/2000 | Saum et al. | |
| 6,087,553 A | 7/2000 | Cohen | |
| 6,156,845 A | 12/2000 | Saito et al. | |
| 6,156,913 A * | 12/2000 | Hyatt | 549/408 |
| 6,184,265 B1 | 2/2001 | Hamilton et al. | |
| 6,204,257 B1 * | 3/2001 | Stella et al. | 514/130 |
| 6,228,900 B1 | 5/2001 | Shen et al. | |
| 6,231,804 B1 | 5/2001 | Yamauchi et al. | |
| 6,242,227 B1 * | 6/2001 | Millis et al. | 435/125 |
| 6,245,276 B1 | 6/2001 | McNulty | |
| 6,277,390 B1 | 8/2001 | Schaffner | |
| 6,391,390 B1 * | 5/2002 | Boisseau et al. | 427/385.5 |
| 6,432,349 B1 | 8/2002 | Pletcher | |
| 6,437,048 B1 | 8/2002 | Saito et al. | |
| 6,448,315 B1 | 9/2002 | Lidgren et al. | |
| 6,464,926 B1 | 10/2002 | Merrill et al. | |
| 6,503,439 B1 | 1/2003 | Burstein | |
| 6,558,794 B1 | 5/2003 | Fehrenbacher | |
| 6,562,540 B2 | 5/2003 | Saum et al. | |

(Continued)

FOREIGN PATENT DOCUMENTS

CS 221403 9/1982
EP 0560279 9/1993

(Continued)

OTHER PUBLICATIONS

International Search Report for PCT/EP2009/008250 dated Jan. 21, 2010.

(Continued)

*Primary Examiner* — Susan W Berman
(74) *Attorney, Agent, or Firm* — Schwegman, Lundberg & Woessner P.A.

(57) ABSTRACT

Certain embodiments described herein are directed to polymer compositions including a protected antioxidant. In some examples, the compositions can also include a deprotected antioxidant, an unprotected antioxidant or both. Methods of producing compositions including a protected antioxidant and articles including a protected antioxidant are also described.

13 Claims, 9 Drawing Sheets

U.S. PATENT DOCUMENTS

| | | |
|---|---|---|
| 6,620,198 B2 | 9/2003 | Burstein et al. |
| 6,627,141 B2 | 9/2003 | McNulty |
| 6,641,617 B1 | 11/2003 | Merrill et al. |
| 6,664,308 B2 | 12/2003 | Sun |
| 6,664,317 B2 | 12/2003 | King, III |
| 6,692,679 B1 | 2/2004 | McNulty |
| 6,786,933 B2 | 9/2004 | Merrill et al. |
| 6,818,020 B2 | 11/2004 | Sun |
| 6,818,172 B2 | 11/2004 | King et al. |
| 6,852,772 B2 | 2/2005 | Muratoglu et al. |
| 6,853,772 B2 | 2/2005 | Battiato |
| 6,872,764 B2 | 3/2005 | King, III |
| 6,933,026 B2 | 8/2005 | Mauze |
| 7,094,472 B2 | 8/2006 | DuPlessis et al. |
| 7,160,492 B2 | 1/2007 | King |
| 7,166,650 B2 | 1/2007 | Muratoglu et al. |
| 7,214,764 B2 | 5/2007 | King |
| 7,259,198 B2 | 8/2007 | Vaillant |
| 7,304,097 B2 | 12/2007 | Muratoglu et al. |
| 7,323,522 B2 * | 1/2008 | Ideno et al. ............... 525/533 |
| 7,335,697 B2 | 2/2008 | King et al. |
| 7,384,430 B2 | 6/2008 | Greer |
| 7,431,874 B2 | 10/2008 | Muratoglu et al. |
| 7,435,372 B2 | 10/2008 | Mimnaugh et al. |
| 7,445,641 B1 | 11/2008 | Ornberg et al. |
| 7,498,365 B2 | 3/2009 | Muratoglu et al. |
| 7,507,774 B2 | 3/2009 | Muratoglu et al. |
| 7,569,620 B2 | 8/2009 | Muratoglu et al. |
| 7,595,074 B2 * | 9/2009 | Cholli et al. ............... 426/541 |
| 7,615,075 B2 | 11/2009 | Kunze et al. |
| 7,705,075 B2 * | 4/2010 | Kumar et al. ............... 524/222 |
| 7,705,176 B2 * | 4/2010 | Cholli et al. ............... 558/162 |
| 2001/0027345 A1 | 10/2001 | Merrill et al. |
| 2001/0049401 A1 | 12/2001 | Salovey et al. |
| 2002/0007219 A1 | 1/2002 | Merrill et al. |
| 2002/0156536 A1 | 10/2002 | Harris et al. |
| 2003/0013781 A1 | 1/2003 | Merrill et al. |
| 2003/0045603 A1 | 3/2003 | Salovey et al. |
| 2003/0105182 A1 | 6/2003 | Merrill et al. |
| 2003/0119935 A1 | 6/2003 | Merrill et al. |
| 2003/0127778 A1 | 7/2003 | Scott et al. |
| 2003/0149125 A1 | 8/2003 | Muratoglu |
| 2003/0158287 A1 | 8/2003 | Salovey et al. |
| 2003/0212161 A1 | 11/2003 | McKellop |
| 2004/0051213 A1 | 3/2004 | Muratoglu |
| 2004/0156879 A1 | 8/2004 | Muratoglu et al. |
| 2005/0006821 A1 | 1/2005 | Merrill et al. |
| 2005/0056971 A1 | 3/2005 | Merrill et al. |
| 2005/0059750 A1 | 3/2005 | Sun et al. |
| 2005/0096749 A1 | 5/2005 | Merrill et al. |
| 2005/0124718 A1 | 6/2005 | Muratoglu et al. |
| 2005/0125074 A1 | 6/2005 | Salovey et al. |
| 2005/0146070 A1 | 7/2005 | Muratoglu et al. |
| 2005/0165495 A1 | 7/2005 | Merrill et al. |
| 2005/0194722 A1 | 9/2005 | Muratoglu et al. |
| 2005/0194723 A1 | 9/2005 | Muratoglu et al. |
| 2005/0267594 A1 | 12/2005 | Merrill et al. |
| 2006/0079597 A1 | 4/2006 | Muratoglu et al. |
| 2006/0115668 A1 | 6/2006 | King et al. |
| 2006/0264541 A1 | 11/2006 | Lederer et al. |
| 2007/0004818 A1 | 1/2007 | Muratoglu et al. |
| 2007/0043137 A1 | 2/2007 | Muratoglu et al. |
| 2007/0059334 A1 | 3/2007 | Abt et al. |
| 2007/0077268 A1 | 4/2007 | King et al. |
| 2007/0114702 A1 | 5/2007 | Muratoglu et al. |
| 2007/0149660 A1 | 6/2007 | Kumar et al. |
| 2007/0191504 A1 | 8/2007 | Muratoglu |
| 2007/0232762 A1 | 10/2007 | Ernsberger et al. |
| 2007/0265369 A1 | 11/2007 | Muratoglu et al. |
| 2007/0267030 A1 | 11/2007 | Muratoglu et al. |
| 2007/0275030 A1 | 11/2007 | Muratoglu et al. |
| 2007/0293646 A1 | 12/2007 | Gosse et al. |
| 2008/0039545 A1 | 2/2008 | Muratoglu et al. |
| 2008/0067724 A1 | 3/2008 | Muratoglu et al. |
| 2008/0090933 A1 | 4/2008 | Muratoglu et al. |
| 2008/0090934 A1 | 4/2008 | Muratoglu et al. |
| 2008/0119582 A1 | 5/2008 | Muratoglu et al. |
| 2008/0133018 A1 | 6/2008 | Salovey et al. |
| 2008/0133021 A1 | 6/2008 | Shen et al. |
| 2008/0140196 A1 | 6/2008 | Schroeder et al. |
| 2008/0214692 A1 | 9/2008 | Muratoglu et al. |
| 2008/0215142 A1 | 9/2008 | Muratoglu et al. |
| 2008/0262120 A1 | 10/2008 | Muratoglu |
| 2008/0274161 A1 | 11/2008 | Muratoglu et al. |
| 2008/0293856 A1 | 11/2008 | Kumer et al. |
| 2008/0319137 A1 | 12/2008 | Rufner et al. |
| 2009/0030524 A1 | 1/2009 | Schroeder et al. |
| 2009/0105364 A1 | 4/2009 | Merrill et al. |
| 2009/0118390 A1 | 5/2009 | Abt et al. |
| 2009/0192610 A1 | 7/2009 | Case et al. |
| 2009/0265001 A1 | 10/2009 | Muratoglu et al. |
| 2009/0281624 A1 | 11/2009 | Conteduca et al. |
| 2010/0029858 A1 | 2/2010 | Rufner et al. |
| 2010/0137481 A1 | 6/2010 | Shen et al. |

FOREIGN PATENT DOCUMENTS

| | | |
|---|---|---|
| EP | 0727195 | 8/1996 |
| EP | 1421918 | 5/2004 |
| EP | 1647242 | 4/2006 |
| WO | WO/01/05337 | 1/2001 |
| WO | WO/01/80778 | 11/2001 |
| WO | WO/03/049930 | 6/2003 |
| WO | WO/2004/024204 | 3/2004 |
| WO | WO/2004/064618 | 8/2004 |
| WO | WO/2004/101009 | 11/2004 |
| WO | WO/2007/019874 | 2/2007 |
| WO | WO/2007/056561 | 5/2007 |
| WO | WO/2007/121167 | 10/2007 |
| WO | WO/2008/092047 | 7/2008 |
| WO | WO/2008/101073 | 8/2008 |
| WO | WO/2008/101134 | 8/2008 |
| WO | WO/2008/113388 | 9/2008 |
| WO | WO/2008/124825 | 10/2008 |
| WO | WO/2009/032909 | 3/2009 |
| WO | WO/2009/045658 | 4/2009 |
| WO | WO 2010/129514 | 11/2010 |

OTHER PUBLICATIONS

Extended EP Search Report and Written Opinion for EP Application No. 10 01 2579 dated Dec. 9, 2010.

Extended EP Search Report and Written Opinion for EP Application No. 10 01 2589 dated Dec. 9, 2010.

"New Joint Replacement Material Developed at MGH put to first Clinic Use" news release from Massachusetts General Hospital, dated Jul. 23, 2007, accessed May 13, 2008.

"Joint Replacement Material Developed at the MGH" from MA General Hosp.MGH Hotline On-line publication dated Aug. 10, 2007.

E-Poly HXLPE Brochure from BioMet Orthopedics, dated 2007.

Wannomae, et al., "Vitamin E Stabilized, Irradiated UHMWPE for Cruciate Retaining Knee Components",, 53rd Annual Meeting of Orthopaedic Research Society,. Feb. 11-14, 2007 Poster No. 1783.

Kurtz, et al., "Trace Concentrations of Vitamin E Protect Radiation Crosslinked UHMWPE from Oxidative Degration", 53rd Annual Meeting of the Orthopaedic Research Society. Feb. 11-14, 2007, Paper No. 0020.

Bragdon, et al., "A New Pin-onDisk Wear Testing Method for Simulating Wear of Polyethylene on Cobalt-Chrome Alloy in Total Hip Arthroplasty", Journal of Arthroplasty, vol. 16 No. 5, 2001 pp. 668-665.

Written Opinion & Search Report for PCT/US2009/032412 dated Mar. 25, 2010.

Written Opinion & Search Report for PCT/US/2008/059909 dated Sep. 14, 2009.

Written Opinion and Search Report for PCT/EP2005/008967 dated Jun. 21, 2006.

Oral, et al., "Blending a-Tocopherol with UHMWPE Powder for Oxidation Resistance", 50$^{th}$ Annual Meeting of Orthopaedic Research Society, Poster No. 1485.

Oral, et al., "x-Tocopherol-doped irradiated UHMWPE for high fatigue resistance and low wear", Biomaterials, vol. 25, 2004, pp. 5515-5522.

Oral, et al., "Characterization of irradiated blends of X-tocopherol and UHMWPE", Biomaterials, vol. 26, 2005, pp. 6657-6663.

Perth, et al "Studies on the effect of electron beam radiation on the molecular structure of ultra-high molecular eight polyethylene under the influence of x-tocopherol w/ respect to its application in medical implants", Jrnl of Materials Science,vol. 13, 2002 pp. 917-.

Tomita, et al., "Prevention of Fatigue Cracks in Ultrahigh Molecular Weight Polyethylene Joint Components by the Addition of Vitamin E" , Applied Biomaterials, vol. 48, 1999, 474-478.

Shibata, at al., "The anti-oxidative properties of x-tocopherol in y-irradiated UHMWPE with respect to fatigue and oxidation resistance", Biomaterials, vol. 26, 2005, pp. 5755-5762.

Bauer, I., et al., "Antioxidant interaction between organic phosphites and hindered amine light stabilisers during processing and thermoxidation of polypropylene", Polymer Degradation and Stability, 48(3), (1995), 427-440.

Bauer, I., et al., "Antioxidant interaction between organic phosphites and hindered amine light stabilizers: effects during photoxidation of polypropylene—II", Polymer Degradation and Stability, 55(2), (1997), 217-224.

Bauer, I., et al., "Hydroperoxide decomposing ability and hydrolytic stability of organic phosphites containing hindered amine moieties (HALS-Phosphites)", Polymer Degradation and Stability, 62(1), (1998), 175-186.

Chmela, S., et al., "HALS-phosphite combinations as light and heat stabilizers for polypropylene", Polymer Degradation and Stability, 39(3), (1993), 367-371.

Habicher, Wolf D, et al., "Synthesis and antioxidative properties of novel multifunctional stabilizers", Journal of Vinyl and Additive Technology, 7(1), (Mar., 2001), 4-18.

Hahner, U., et al., "Synthesis and antioxidative efficiency of organic phosphites and phosphonites with 2.2.6.6-tetramethylpiperidin-4-yl groups", Polymer Degradation and Stability, 41(2), (1993), 197-203.

Rufner, Alicia, et al., "An Antioxidant Stabilized Crosslinked Ultra-High Molecular Weight Polyethylene for Medical Device Applications", U.S. Appl. No. 12/847,741, Application Filed Jul. 30, 2010, 69 pgs.

US 7,253,214, 08/2007, McKellop (withdrawn)

* cited by examiner

FIG. 1A  R-H ⟶ R• + H•
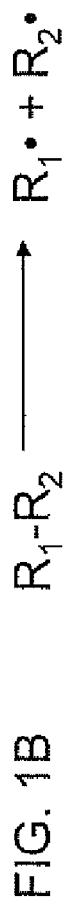
FIG. 1B  $R_1-R_2$ ⟶ $R_1•+R_2•$
FIG. 2A  R-H ⟶ R• + H•
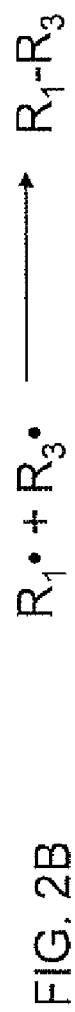
FIG. 2B  $R_1-R_3$ ⟶ $R_1• + R_3•$
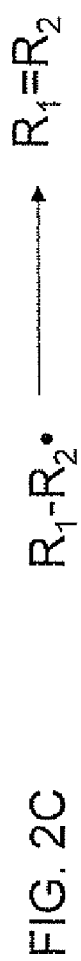
FIG. 2C  $R_1=R_2$ ⟶ $R_1-R_2•$ FIG. 3A $\quad R_1\cdot + O_2 \longrightarrow R_1O_2\cdot$ FIG. 3B $\quad R_1O_2\cdot + R_2H \longrightarrow R_1OOH + R_2\cdot$ FIG. 4 $\quad R\cdot + AOH \longrightarrow RH + AO\cdot$ FIG. 5A $\quad R_1\cdot + R_2\cdot + AO\text{-}X \longrightarrow R_1\text{-}R_2 + AO\text{-}X$ FIG. 5B $\quad R_1\text{-}R_2 + AOX \longrightarrow R_1\text{-}R_2 + AOH + X$ FIG. 5C $\quad R_1\text{-}R_2 + AOH \xrightarrow{R_3\cdot} R_1\text{-}R_2 + R_3H + AO\cdot$

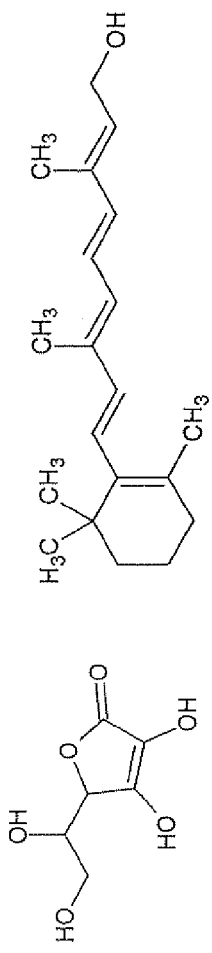
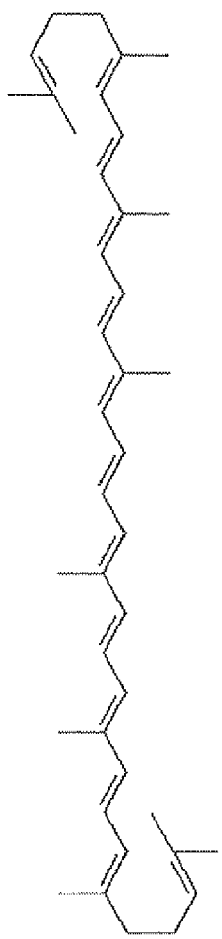
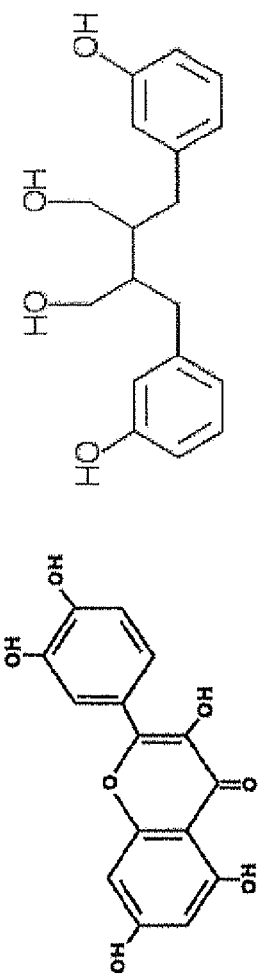
FIG. 7A
FIG. 7B
FIG. 7C
FIG. 7D
FIG. 7E $R_1OOH + (P-OR_2) \longrightarrow R_1-OH + O=P-OR_2$

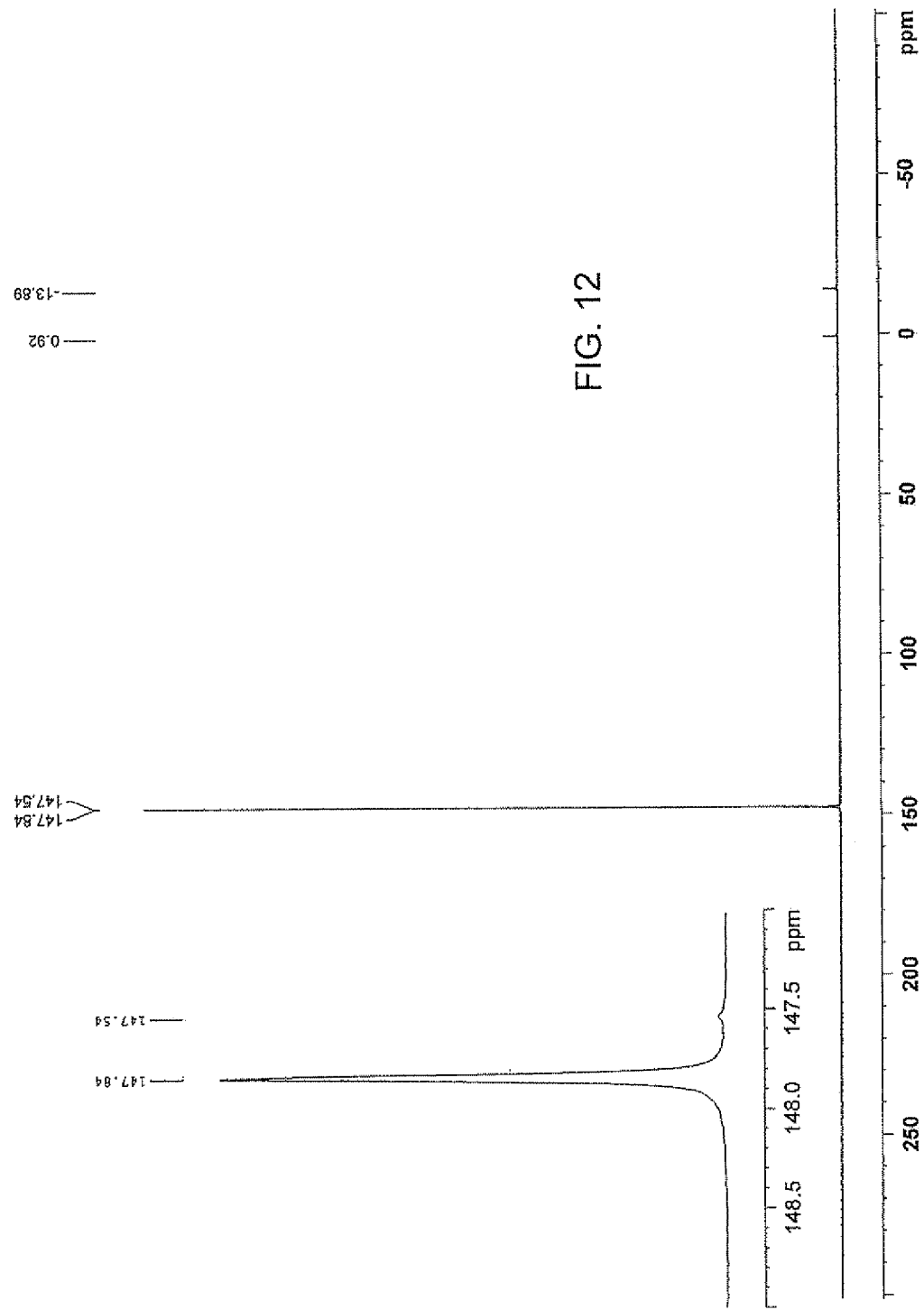

POLYMER [[S]] COMPOSITIONS INCLUDING AN ANTIOXIDANT

TECHNOLOGICAL FIELD

Certain features, aspect and embodiments are directed to compositions, articles and methods that include a polymer and a protected antioxidant. In particular, certain embodiments are directed to compositions that include ultrahigh molecular weight polyethylene and a protected antioxidant.

BACKGROUND

Many endoprosthetic joint replacements currently implanted in patients include a highly polished metal or ceramic component articulating on an ultra high molecular weight polyethylene (UHMWPE) material. Wear and abrasion resistance, coefficient of friction, impact strength, toughness, density, biocompatibility and biostability are some of the properties that make UHMWPE a suitable material for such implants. Although UHMWPE has been used in implants for many years, there is continuing interest in the wear and durability characteristics of implants incorporating UHMWPE.

SUMMARY

In one aspect, a composition comprising a blend of pre-crosslinked ultrahigh molecular weight polyethylene and a protected antioxidant is provided. In certain examples, the protected antioxidant comprises a phosphite protecting group. In other examples, the protected antioxidant comprises a tocopherol comprising the phosphite protecting group. In additional examples, the protected antioxidant comprises a tocotrienol comprising the phosphite protecting group. In some examples, the protected antioxidant comprises a phosphate protecting group. In certain embodiments, the protected antioxidant comprises a tocopherol comprising the phosphate protecting group. In other embodiments, the protected antioxidant comprises a tocotrienol comprising the phosphate protecting group. In additional embodiments, the protected antioxidant is uniformly dispersed throughout the pre-crosslinked ultrahigh molecular weight polyethylene to provide a blend of pre-crosslinked ultrahigh molecular weight polyethylene and protected antioxidant. In some embodiments, the composition can include an unprotected antioxidant. In certain embodiments, the protected antioxidant and the unprotected antioxidant comprise the same base antioxidant. In other embodiments, the composition can include a deprotected antioxidant.

In another aspect, a composition comprising crosslinked ultrahigh molecular weight polyethylene, and a protected antioxidant in the crosslinked ultrahigh molecular weight polyethylene is described. In certain examples, the protected antioxidant comprises a phosphite protecting group. In other examples, the protected antioxidant comprises a tocopherol comprising the phosphite protecting group. In some examples, the protected antioxidant comprises a tocotrienol comprising the phosphite protecting group. In additional examples, the protected antioxidant comprises a phosphate protecting group. In certain embodiments, the protected antioxidant comprises a tocopherol comprising the phosphate protecting group. In other embodiments, the protected antioxidant comprises a tocotrienol comprising the phosphate protecting group. In some examples, the protected antioxidant is uniformly dispersed throughout the crosslinked ultrahigh molecular weight polyethylene. In certain examples, the composition can include an unprotected antioxidant. In some examples, the protected antioxidant and the unprotected antioxidant comprise the same base antioxidant. In additional examples, the composition can include a deprotected antioxidant.

In an additional aspect, a composition comprising crosslinked ultrahigh molecular weight polyethylene, and an antioxidant mixture comprising a protected antioxidant and an unprotected antioxidant, in which the antioxidant mixture has a substantially uniform distribution throughout the crosslinked ultrahigh molecular weight polyethylene is provided. In certain examples, the protected antioxidant comprises a phosphite protecting group. In other examples, the protected antioxidant comprises a tocopherol comprising the phosphite protecting group. In some examples, the protected antioxidant comprises a tocotrienol comprising the phosphite protecting group. In additional examples, the protected antioxidant comprises a phosphate protecting group. In other examples, the protected antioxidant comprises a tocopherol comprising the phosphate protecting group. In certain embodiments, the protected antioxidant comprises a tocotrienol comprising the phosphate protecting group. In other embodiments, the protected antioxidant and the unprotected antioxidant comprise the same antioxidant. In some embodiments, the composition can include a deprotected antioxidant.

In another aspect, a composition comprising a blend of ultrahigh molecular weight polyethylene and an antioxidant mixture comprising a protected antioxidant and a deprotected antioxidant, the blend comprising a substantially uniform distribution of the antioxidant mixture in the ultrahigh molecular weight polyethylene is disclosed. In certain embodiments, the protected antioxidant comprises a phosphite protecting group. In other embodiments, the protected antioxidant comprises a tocopherol comprising the phosphite protecting group. In some embodiments, the protected antioxidant comprises a tocotrienol comprising the phosphite protecting group. In other embodiments, the protected antioxidant comprises a phosphate protecting group. In certain examples, the protected antioxidant comprises a tocopherol comprising the phosphate protecting group. In other examples, the protected antioxidant comprises a tocotrienol comprising the phosphate protecting group. In additional examples, the composition can include an unprotected antioxidant. In some embodiments, the protected antioxidant and the unprotected antioxidant comprise the same base antioxidant.

In an additional aspect, a composition comprising a blend of ultrahigh molecular weight polyethylene and an antioxidant mixture comprising a protected antioxidant and an unprotected antioxidant, the blend comprising a substantially uniform distribution of the antioxidant mixture in the ultrahigh molecular weight polyethylene is provided. In certain examples, the protected antioxidant comprises a phosphite protecting group. In other examples, the protected antioxidant comprises a tocopherol comprising the phosphite protecting group. In some examples, the protected antioxidant comprises a tocotrienol comprising the phosphite protecting group. In other examples, the protected antioxidant comprises a phosphate protecting group. In additional examples, the protected antioxidant comprises a tocopherol comprising the phosphate protecting group. In some examples, the protected antioxidant comprises a tocotrienol comprising the phosphate protecting group. In other examples, the protected antioxidant and the unprotected antioxidant comprise the same antioxidant. In certain examples, the composition can include a deprotected antioxidant.

In another aspect, a method comprising mixing ultrahigh molecular weight polyethylene and a protected antioxidant, and exposing the mixed ultrahigh molecular weight polyethylene and protected antioxidant to radiation to crosslink the ultrahigh molecular weight polyethylene is disclosed. In certain examples, the method can include converting at least some of the protected antioxidant to a deprotected antioxidant. In other examples, the method can include mixing the ultrahigh molecular weight polyethylene and the protected antioxidant to provide a blend comprising a substantially uniform distribution of the protected antioxidant throughout the ultrahigh molecular weight polyethylene. In additional examples, the method can include exposing the mixed ultrahigh molecular weight polyethylene and protected antioxidant to gamma radiation. In some examples, the method can include exposing the mixed ultrahigh molecular weight polyethylene and protected antioxidant to electron beam radiation. In certain embodiments, the method can include mixing a deprotected antioxidant with the ultrahigh molecular weight polyethylene and the protected antioxidant. In some embodiments, the antioxidant of the protected antioxidant and the antioxidant of the deprotected antioxidant are the same antioxidant. In other embodiments, the method can include consolidating the mixed ultrahigh molecular weight polyethylene and antioxidant mixture prior to the exposing step. In some examples, the method can include converting at least some of the protected antioxidant to deprotected antioxidant after the exposing step. In additional examples, the method can include consolidating the mixed ultrahigh molecular weight polyethylene and antioxidant mixture after the exposing step.

In an additional aspect, a method comprising doping a protected antioxidant into ultrahigh molecular weight polyethylene to provide a gradient of antioxidant in the ultrahigh molecular weight polyethylene is described. In certain examples, the method can include crosslinking the ultrahigh molecular weight polyethylene prior to doping with the protected antioxidant. In other examples, the method can include crosslinking the ultrahigh molecular weight polyethylene in the presence of the protected antioxidant and then doping the crosslinked ultrahigh molecular weight polyethylene with the protected antioxidant to provide the gradient of protected antioxidant. In some examples, the method can include doping the ultrahigh molecular weight polyethylene with an unprotected antioxidant.

In another aspect, a method comprising mixing ultrahigh molecular weight polyethylene and an antioxidant mixture comprising a protected antioxidant and an unprotected antioxidant, and exposing the mixed ultrahigh molecular weight polyethylene and antioxidant mixture to radiation to crosslink the ultrahigh molecular weight polyethylene is provided. In certain examples, the method can include converting at least some of the protected antioxidant to a deprotected antioxidant. In some examples, the method can include mixing the ultrahigh molecular weight polyethylene and the antioxidant mixture to provide a blend comprising a substantially uniform distribution of the antioxidant mixture throughout the ultrahigh molecular weight polyethylene. In certain embodiments, the method can include exposing the mixed ultrahigh molecular weight polyethylene and antioxidant mixture to gamma radiation. In some embodiments, the method can include exposing the mixed ultrahigh molecular weight polyethylene and antioxidant mixture to electron beam radiation. In some examples, the method can include mixing a deprotected antioxidant with the ultrahigh molecular weight polyethylene. In additional examples, the antioxidant of the protected antioxidant and the antioxidant of the deprotected antioxidant comprise the same base antioxidant. In other examples, the method can include consolidating the mixed ultrahigh molecular weight polyethylene and antioxidant mixture prior to the exposing step. In some examples, the method can include converting at least some of the protected antioxidant to deprotected antioxidant after the exposing step. In additional examples, the method can include consolidating the mixed ultrahigh molecular weight polyethylene and antioxidant mixture after the exposing step.

In an additional aspect, a method comprising mixing ultrahigh molecular weight polyethylene and an antioxidant mixture comprising a protected antioxidant and a deprotected antioxidant, and exposing the mixed ultrahigh molecular weight polyethylene and antioxidant mixture to radiation to crosslink the ultrahigh molecular weight polyethylene is disclosed. In certain examples, the method can include converting at least some of the protected antioxidant to deprotected antioxidant after the exposing step. In some examples, the method can include mixing the ultrahigh molecular weight polyethylene and the antioxidant mixture to provide a blend comprising a substantially uniform distribution of the antioxidant mixture throughout the ultrahigh molecular weight polyethylene. In additional examples, the method can include exposing the mixture to gamma radiation. In other examples, the method can include exposing the mixture to electron beam radiation. In certain embodiments, the method can include mixing a deprotected antioxidant with the ultrahigh molecular weight polyethylene. In some examples, the antioxidant of the protected antioxidant and the antioxidant of the deprotected antioxidant comprise the same base antioxidant. In certain examples, the method can include consolidating the mixed ultrahigh molecular weight polyethylene and antioxidant mixture prior to the exposing step. In other examples, the method can include converting at least some of the protected antioxidant to deprotected antioxidant after the exposing step. In some examples, the method can include consolidating the mixed ultrahigh molecular weight polyethylene and antioxidant mixture after the exposing step.

In another aspect, a method of facilitating production of an implant comprising providing ultrahigh molecular weight polyethylene, and providing a protected antioxidant is described. In certain embodiments, the method can include providing instructions for mixing the ultrahigh molecular weight polyethylene and the protected antioxidant to provide a substantially uniform blend of the protected antioxidant in the ultrahigh molecular weight polyethylene. In other embodiments, the method can include providing instructions for exposing the ultrahigh molecular weight polyethylene and the protected antioxidant to radiation to crosslink the ultrahigh molecular weight polyethylene. In additional embodiments, the method can include providing instructions to convert at least some of the protected antioxidant to a deprotected antioxidant. In other embodiments, the method can include providing a deprotected antioxidant. In some examples, the method can include providing instructions for doping the protected antioxidant in the ultrahigh molecular weight polyethylene. In other examples, the method can include providing instructions for exposing the ultrahigh molecular weight polyethylene comprising the doped protected antioxidant to radiation to crosslink the ultrahigh molecular weight polyethylene. In certain examples, the method can include providing instructions for consolidating the mixed ultrahigh molecular weight polyethylene and the protected antioxidant, providing instructions for exposing the ultrahigh molecular weight polyethylene and the protected antioxidant to radiation to crosslink the consolidated ultrahigh molecular weight polyethylene, and providing instructions for converting at least some of the protected antioxidant to a deprotected antioxidant.

In an additional aspect, a method of facilitating production of an implant comprising providing ultrahigh molecular weight polyethylene, providing an antioxidant, providing a protecting agent, and providing instructions for using the protecting agent and the antioxidant to provide a protected antioxidant is provided. In certain embodiments, the method can include providing instructions for mixing the ultrahigh molecular weight polyethylene and the protected antioxidant to provide a substantially uniform blend of the protected antioxidant in the ultrahigh molecular weight polyethylene. In other embodiments, the method can include providing instructions for exposing the ultrahigh molecular weight polyethylene and the protected antioxidant to radiation to crosslink the ultrahigh molecular weight polyethylene. In some embodiments, the method can include providing instruction to convert at least some of the protected antioxidant to a deprotected antioxidant. In some examples, the method can include providing a deprotected antioxidant. In additional examples, the method can include providing instructions for doping the protected antioxidant in the ultrahigh molecular weight polyethylene. In some examples, the method can include providing instructions for exposing the ultrahigh molecular weight polyethylene comprising the doped protected antioxidant to radiation to crosslink the ultrahigh molecular weight polyethylene. In certain embodiments, the method can include providing instructions for consolidating the mixed ultrahigh molecular weight polyethylene and the protected antioxidant, providing instructions for exposing the ultrahigh molecular weight polyethylene and the protected antioxidant to radiation to crosslink the consolidated ultrahigh molecular weight polyethylene, and providing instructions for converting at least some of the protected antioxidant to a deprotected antioxidant.

In another aspect, a method comprising combining ultrahigh molecular weight polyethylene and a protected antioxidant to provide a blend, consolidating the blend of ultrahigh molecular weight polyethylene and a protected antioxidant, exposing the consolidated blend of ultrahigh molecular weight polyethylene and a protected antioxidant to radiation to crosslink the ultrahigh molecular weight polyethylene, and converting at least some of the protected antioxidant to deprotected antioxidant is provided.

In an additional aspect, a method comprising combining ultrahigh molecular weight polyethylene and a protected antioxidant to provide a blend, exposing the blend of ultrahigh molecular weight polyethylene and a protected antioxidant to radiation to crosslink the ultrahigh molecular weight polyethylene, consolidating the crosslinked blend of ultrahigh molecular weight polyethylene and a protected antioxidant, and converting at least some of the protected antioxidant to deprotected antioxidant is described.

In another aspect, a composition produced by mixing ultrahigh molecular weight polyethylene with a protected antioxidant, and exposing the mixture of ultrahigh molecular weight polyethylene with a protected antioxidant to radiation to crosslink the ultrahigh molecular weight polyethylene is provided.

In an additional aspect, an article comprising pre-crosslinked or crosslinked ultrahigh molecular weight polyethylene and protected antioxidant in the pre-crosslinked or crosslinked ultrahigh molecular weight polyethylene is provided. In certain examples, the protected antioxidant is present in a substantially uniform distribution throughout the crosslinked ultrahigh molecular weight polyethylene. In other examples, the article can include unprotected antioxidant in the crosslinked ultrahigh molecular weight polyethylene. In some examples, the article can include deprotected antioxidant in the crosslinked ultrahigh molecular weight polyethylene. In other examples, the article can include unprotected antioxidant in the crosslinked ultrahigh molecular weight polyethylene. In additional examples, the article may further include an additional component joined to the article to form an implant. In some examples, the article comprises at least portions of an artificial hip, hip liner, knee, knee liner, disk replacement, shoulder, elbow, foot, ankle, finger, mandible or bearings in artificial heart.

Additional aspects, features, embodiments, and examples are described in more detail below.

BRIEF DESCRIPTION OF THE FIGURES

Certain illustrative embodiments are described in more detail below with reference to the accompanying figures in which:

FIGS. 1A and 1B show formation of radical species, in accordance with certain examples;

FIGS. 2A-2C show recombination of radicals with each other, in accordance with certain examples;

FIG. 3A shows reaction of a radical species with oxygen to form a hydroperoxide, and FIG. 3B shows reaction of the formed hydroperoxide with a polymer chain, in accordance with certain examples;

FIG. 4 shows reaction of a radical species with an antioxidant, in accordance with certain examples;

FIGS. 5A-5C show protection and deprotection of an antioxidant and reaction of the antioxidant with a radical species to protect the polymer chain, in accordance with certain examples;

FIGS. 7A-7H show chemical structures of various antioxidants, in accordance with certain examples;

FIG. 12 is a nuclear magnetic resonance spectrum of a produced vitamin E phosphite, in accordance with certain examples.

Figure 6A:
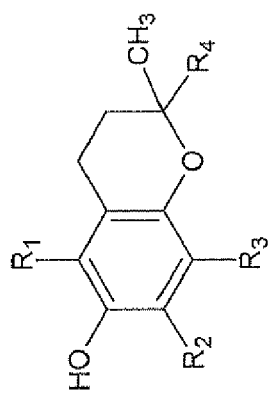
FIGS. 6A-6C show various tocopherol species, in accordance with certain examples.

Certain figures and the description herein refer to chemical structures or portions of chemical structures. Unless otherwise depicted in the chemical structures, no particular stereochemistry is intended to be implied in the chemical structures. In addition, the bond lengths, bond angles, geometries or other physical parameters of the chemical structures may be distorted, disproportionate or otherwise shown in a non-conventional manner to facilitate a better understanding of the technology described herein. Unless otherwise stated or shown, no particular stoichiometry is intended or implied in the illustrative reaction schemes shown and described herein or in the figures. It will be within the ability of the person of ordinary skill in the art, given the benefit of this disclosure, to determine suitable stoichiometries and amounts of a particular component used in a selected reaction.

DETAILED DESCRIPTION

Certain embodiments described herein include one or more of a protected antioxidant, a deprotected antioxidant or an unprotected antioxidant. The phrase "protected antioxidant" refers to an antioxidant that includes one or more protecting groups or protecting moieties. The protecting group or protecting moieties can be added to prevent, or reduce to at least some degree, the antioxidant from scavenging free radicals during, for example, exposure to ionizing irradiation for crosslinking. Illustrative protecting groups and reactions to provide a protected antioxidant are described in more detail below. The phrase "deprotected antioxidant" refers to an antioxidant that is provided when at least some portion of the protecting group or protecting moiety of the protected antioxidant is removed from the protected antioxidant. For example, an antioxidant may be protected by addition of one or more protecting groups. Either all or some portion of the protecting group can be removed to provide a deprotected antioxidant, which may have the same chemical structure as the original antioxidant, prior to protection, or may be some chemically modified form of the antioxidant that is different than either of the antioxidant or the protected antioxidant. Unlike the protected antioxidant, the deprotected antioxidant is effective to scavenge free radicals. The phrase "unprotected antioxidant" refers to an antioxidant that has not been reacted with a protecting group, and, instead, is used in its native form. In instances where the protecting group is entirely removed from a protected antioxidant to provide a fully deprotected antioxidant, the unprotected antioxidant and the deprotected antioxidant can have the same chemical structure.

In certain examples, the antioxidants described herein can be used to reduce or prevent oxidation of the accompanying substrate. For example, the antioxidant can prevent oxidation of polymer chains, which can lead to chain scission and result in reduced molecular weight and/or subsequent embrittlement of the polymer. Oxidation of the polymer can be initiated by the formation of a radical species that can be generated thermally, photolytically or by high energy radiation. Examples of such processes are shown in FIGS. 1A and 1B. Referring to FIG. 1A, free radicals can be generated when the bond between a carbon atom and a hydrogen atom is broken and results in an unpaired electron being present on the carbon (represented as R.) and on the hydrogen (represented as H.). Similarly and referring to FIG. 1B, the bond between two carbon atoms may be broken to provide two free organic radicals (represented as $R_1.$ and $R_2.$). Formation of these radicals initiates a chain reaction whereby the radicals react with other species in the composition. For example, the radicals may recombine (FIG. 2A), combine with other free radicals (FIG. 2B), or provide vinyl unsaturation by disproportionation (FIG. 2C). The free radical can also combine with other species such as, for example, oxygen, to form peroxide species (FIG. 3A). Formation of peroxides, such as the hydroperoxides shown in FIG. 3A, can result in a self-propagating reaction (FIG. 3B).

In certain examples, to scavenge free radicals and prevent or reduce the reactions shown in FIGS. 1A-3B, an antioxidant can be added to the polymer to reduce or prevent such degradation. In the presence of an antioxidant, the free radical is transferred to the antioxidant (AO) thereby preventing other reactions with the polymer (see FIG. 4). While the antioxidant can reduce or prevent degradation of the polymer, the antioxidant can also react with radical polymer chains and prevent crosslinking of those chains. Such reactions can reduce the degree of crosslinking in the polymer chain, which can lead to polymer substrates with less than desired properties.

Certain embodiments described herein provide the benefit of having an antioxidant present in the composition but provides a desired form of the antioxidant such that little or no reactions of the antioxidant and polymer occur to permit suitable crosslinking of the polymer. A general scheme is shown in FIG. 5A-5C. Referring to FIG. 5A, two polymer chains are shown as $R_1.$ and $R_2.$. If an unprotected antioxidant were present in substantial amounts, it could react with either of $R_1.$ or $R_2.$ and prevent a reaction between $R_1.$ and $R_2.$, which may result in crosslinking. By adding a protected antioxidant (AO-X) rather than an unprotected antioxidant (AOH), reaction between $R_1.$ and $R_2.$ may occur (FIG. 5A). Once the polymer chains are crosslinked, the protected antioxidant (AO-X) can be deprotected such that an active antioxidant form is present. Such deprotection removes at least some portion of the protecting group (X) to provide an active antioxidant (AOH) as shown in FIG. 5B. The production of the active antioxidant permits reaction of the antioxidant (AOH) with any free radicals that may form, such as the free radical $R_3.$ shown in FIG. 5C. It will be understood by the person of ordinary skill in the art, given the benefit of this disclosure, that the antioxidant (AO), once deprotected, may or may not have the same chemical structure prior to protection. Returning the antioxidant to its original structure is not critical provided that the resulting deprotected form has at least some free radical scavenging ability.

Figure 6B:
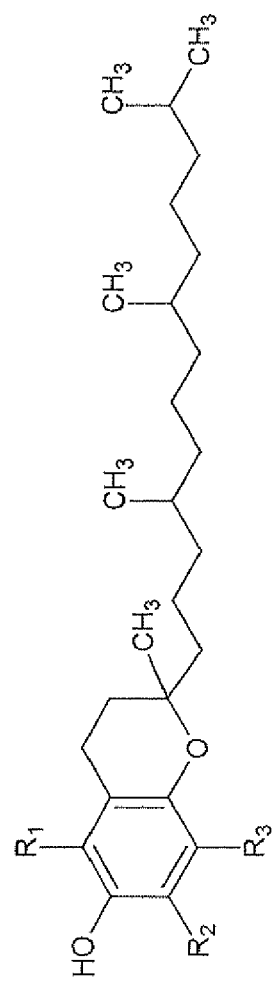
Figure 6C:
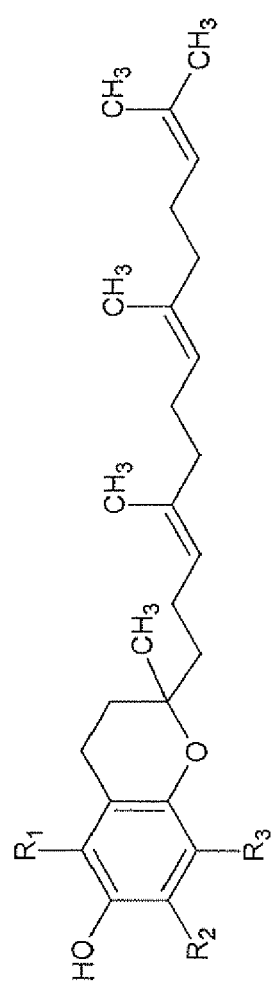

In certain examples, the particular antioxidant used in the compositions may vary depending on the intended use of the composition, the particular material selected, cost or other factors. In certain embodiments, the antioxidant can be selected to be a tocopherol or a tocotrienol. Tocopherols and tocotrienols have a general structure as shown in FIG. 6A. In certain examples, $R_1$, $R_2$ and $R_3$ of FIG. 6A can each be hydrogen, a saturated or an unsaturated alkyl chain having one to four carbon atoms such as for, example, methyl, ethyl, propyl, butyl, ethylene, propylene, butylene, a cyclic alkyl group such as, for example, cyclopentyl or cyclohexyl, and a phenyl group. In certain embodiments, $R_4$ can be an alkyl chain, e.g., either straight or branched, having two to twenty carbon atoms, more particular, ten to eighteen carbon atoms, for example about twelve to about sixteen carbon atoms, e.g., fifteen carbon atoms. In certain examples, the particular atoms included in the $R_4$ group can determine whether or not the structure in FIG. 6A is a tocopherol or a tocotrienol. For example and referring to FIG. 6B, $R_4$ has been selected to provide a tocopherol (Vitamin E). In FIG. 6C, $R_4$ has three sites of unsaturation to provide a tocotrienol. In some examples, the antioxidant may be synthetic d,l-alpha-tocopherol, whereas in other examples the antioxidant may be a naturally occurring tocopherol or tocotrienol or combinations or blends thereof.

Figure 7F:
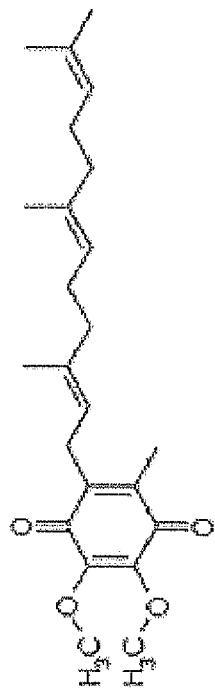
Figure 7G:
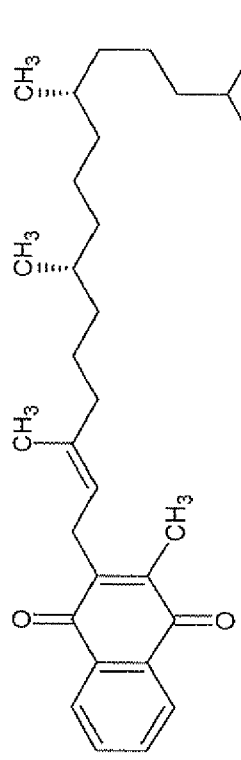
Figure 7H:
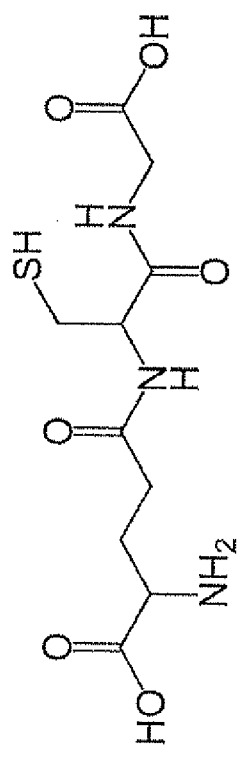

In certain examples, the antioxidant used in the compositions disclosed herein may be one or more of Vitamin C (FIG. 7A), either in the form shown in FIG. 7A or as ascorbyl palmitate or other lipid soluble forms of Vitamin C, a carotene such as, for example, Vitamin A (FIG. 7B) or lycopene (FIG. 7C), a flavinoid such as, for example, flavonol (FIG. 7D), an isoflavinoid, a neoflavinoid, a lignan such as, for example, enterodiol (FIG. 7E), a quinine or a ubiquinone such as, for example, coenzyme Q10 (FIG. 7F) or Vitamin K1 (FIG. 7G), a metal such as, for example, selenium, or glutathione (FIG. 7H). Additional suitable antioxidants include, but are not limited to, propyl gallate, octyl gallate, lauryl gallate, resveratrol, rosmarinic acid, rutin, 5-aminosalicylic acid, butylated hydroxyl anisole, butylated hydroxyl toluene, t-butyl hydroquinone and other biocompatible phenolic compounds, and monomeric or polymeric hindered amine stabilizers. In certain embodiments, the antioxidant shown in FIGS. 7A-7H may be derivatized with one or more functional groups. In some examples, the antioxidant can be used in combination with one or more catalysts or enzymes such as, for example, a metal, superoxide dismutase, catalase, or glutathione peroxidase. Where the antioxidant is colored, it may be desirable to include one or more dyes or pigments to counter the particular color and provide a part or implant of a desired final color.

In certain examples, two or more different types of antioxidants can be used in the polymer compositions disclosed herein. For example, a deprotected tocopherol may be used in combination with an unprotected tocotrienol, a protected tocopherol may be used in combination with an unprotected tocotrienol, or antioxidants having different underlying chemical structures can be used together. In certain instances, a tocopherol can be combined with a flavinoid, a tocopherol can be used in combination with a carotene, a flavinoid and a carotene can be used together or other combinations of antioxidants can be used. In some embodiments, two, three, four, five, six or more different antioxidants can be used in the polymer compositions described herein, any one or more of which may be present in a protected form for at least some period.

In certain embodiments, the antioxidant selected for use can be protected prior to addition to the polymer. Protection of the antioxidant may be accomplished by reaction of the antioxidant with a suitable species to "tie up" the particular group or groups that are effective to scavenge free radicals. In many instances, the group that scavenges free radical is a hydroxyl or carbonyl group of the antioxidant. Thus, the hydroxyl group can be modified or derivatized to prevent such free radical scavenging. Suitable reactions and conditions to add a particular protecting group will be readily selected by the person of ordinary skill in the art, given the benefit of this disclosure.

Figure 8:
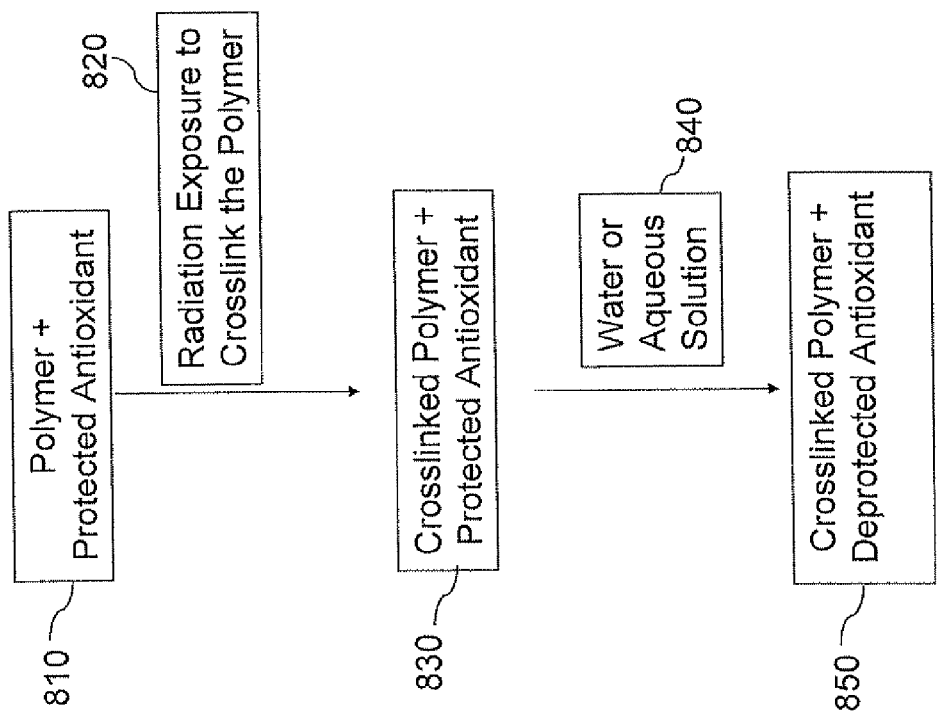
FIG. 8 is a schematic of a process to produce a polymer composition, in accordance with certain examples.

In certain examples, the protecting group added to the antioxidant can vary depending on the desired reaction, the ease of subsequent removal of the protecting group or other factors. In some instances, the protecting group that is added may be effective to hydrolyze such that removal of the protecting group can be accomplished by adding water or an aqueous solution to the polymer/antioxidant mixture. An illustrative production scheme is shown in FIG. 8. In a first step 810, the polymer and protected antioxidant can be combined. The combination may then be exposed to radiation at step 820 to crosslink the polymer and provide a crosslinked polymer/protected antioxidant combination at step 830. During step 820, the exposure to radiation can take place with the polymer/protected antioxidant being in an organic solvent, in dry form or at other suitable conditions where the protecting group can remain on the antioxidant. The crosslinked polymer/protected antioxidant can then be exposed to water or an aqueous solution at step 840 to hydrolyze the protecting group and provide a crosslinked polymer/deprotected antioxidant at step 850. The crosslinked polymer/deprotected antioxidant can then be formed into an implant or used in other selected manners.

It will be recognized by the person of ordinary skill in the art, given the benefit of this disclosure, that the particular protecting group selected can depend on the particular functional groups present on the antioxidant, the desired synthetic yield and other factors. For example, it may be desirable to select a first protecting group to protect a hydroxyl group of a first antioxidant and a second and different protecting group to protect a carbonyl or a second antioxidant. In certain examples, the protecting group can be a phosphite group, a phosphate group, a cyanophosphite group, a cyanophosphate group, a sulfo-group, an acetyl (Ac) group, a benzoyl (Bz) group, a benzyl (Bn) group, a β-methoxyethoxymethyl ether (MEM) group, a dimethoxytrityl[bis-(4-methoxyphenyl) phenylmethyl] (DMT) group, a methoxymethyl ether (MOM) group, a methoxytrityl[(4-methoxyphenyl)diphenylmethyl] (MMT) group, a p-methoxybenzyl ether (PMB) group, a methylthiomethyl ether group, a pivaloyl (Piv) group, a tetrahydropyranyl (THP) group, a trityl(triphenylmethyl) (Tr) group, a silyl ether group such as, for example, a trimethylsilyl (TMS) group, a tert-butyldimethylsilyl (TBDMS) group, a tert-butyldimethylsilyloxymethyl (TOM) group and a triisopropylsilyl (TIPS) ether group), a methyl ether group, an ethoxyether group, a carbobenzyloxy (Cbz) group, a p-methoxybenzyl carbonyl (Moz or MeOZ) group, a tert-butyloxycarbonyl (BOC) group, a 9-fluorenylmethyloxycarbonyl (FMOC) group, a 3,4-dimethoxybenzyl (DMPM) group, a p-methoxyphenyl (PMP) group, a tosyl (Ts) group, a sulfonamide group such as, for example, Nosyl & Nps groups, a methyl ester group, a benzyl ester groups, an orthoester group, an acetal group, a ketal group, a acylal group, a dithiane group, a tert-butyl ester group, a silyl ester group, an oxazoline group, a 2-cyanoethyl group, a methyl group and other similar protecting groups.

In the illustrative protecting groups described above, the particular conditions used to deprotect the antioxidant can vary depending on the particular protecting group added to the antioxidant. For example, an acetyl group or a benzoyl group can be removed by acid or base, a benzyl group can be removed by hydrogenolysis, a β-Methoxyethoxymethyl ether group can be removed by acid, a DMT group can be removed using a weak acid, an MOM group can be removed using acid, a MMT group can be removed by acid, hydrogenolysis, or oxidation, a methylthiomethyl ether group can be removed by acid, a pivaloyl group can be removed by acid, base or reducing agent, a THP group can be removed by acid, a Tr group can be removed by acid and hydrogenolysis, a silyl ether group can be removed by acid or fluoride ions, a methyl ether group can be removed using TMSI in DCM (or MeCN or chloroform) or by using $BBr_3$ in DCM, an ethoxyethyl ether can be removed using acid, a Cbz group can be removed by hydrogenolysis, a Moz or MeOZ group can be removed using hydrogenolysis, a tert-butyloxycarbonyl (BOC) group can be removed using concentrated, strong acid (such as HCl or $CF_3COOH$), a 9-fluorenylmethyloxycarbonyl (FMOC) group can be removed by base such as piperidine, a DMPM group can be removed by hydrogenolysis, a PMEP group can be removed by ammonium cerium(IV) nitrate (CAN), a Ts group can be removed by concentrated acid (such as HBr or $H_2SO_4$) and strong reducing agents (sodium in liquid ammonia, sodium naphthalene, etc.), sulfonamides can be removed by samarium iodide, or tributyltin hydride, acetals and ketals can be removed by acid, an acylal group can be removed using a Lewis acid, a dithiane group can be removed using a metal salt or an oxidizing agent, a methyl ester can be removed using an acid or a base, a tert-butyl ester group can be removed by acid, base and some reducing agents, a silyl ester can be removed by acid, base and organometallic reagents, an orthoester can be removed by mild aqueous acid to form an ester, which can then be removed according to ester removal procedures, an oxazoline group can be removed by strong hot acid or alkali, a 2-cyanoethyl group can be removed by mild base, a methyl group can be removed by a strong nucleophile such as, for example, thiophenol/triethylamine.

In some embodiments, the protecting group may react with additional molecules of antioxidant. For example, the protecting group may include additional sites that can couple to other antioxidant molecules. In certain examples, a single protecting group can be coupled to two, three, four or more antioxidant molecules and can provide protection to each of the antioxidant molecules. Where a phosphite protecting group is present, for example, the phosphite may include three antioxidant molecules each bound to a phosphorous core atom.

In certain embodiments, the antioxidants used herein can include two or more protecting groups. For example, where the antioxidant includes multiple hydroxyl groups (or multiple other reactive groups), it can be desirable to protect some or all of such reactive groups. Where two or more reactive groups are protected, the protecting group can be the same or can be different. It may be desirable to remove only one of the protecting groups, or in certain instances, all of the protecting groups can be removed prior to use of the composition. Where one or more of the protecting groups are removed, only a portion of that protecting group can be removed to provide a deprotected antioxidant.

Figure 9:
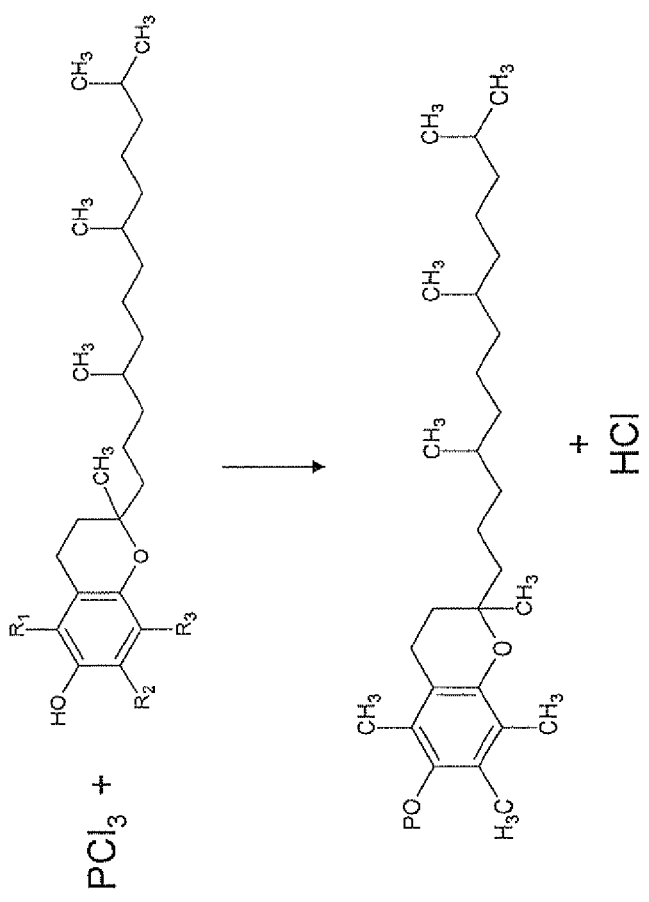
FIG. 9 shows a reaction scheme for producing a vitamin E phosphite, in accordance with certain examples.
Figure 10:
FIG. 10 shows reaction between a phosphite and a hydroperoxide, in accordance with certain examples.

In one embodiment, the antioxidant can be selected to be a tocopherol (or tocopherol blend) and the protecting group can be selected to be a phosphite or a phosphate. An illustrative reaction to produce a protected tocopherol having a phosphite protecting group is shown in FIG. 9. The reaction includes combining phosphorous trichloride ($PCl_3$) and excess tocopherol. The resulting products include hydrochloric acid (HCl) and a tocopherol phosphite. While not shown the phosphorous atom of FIG. 9 can react with additional molecules of tocopherol to provide a product that includes two antioxidant molecules bound to the phosphorous atom or three antioxidant molecules bound to the phosphorous atom. FIG. 9 shows the use of a tocopherol as an antioxidant, but other phenols may be used and reacted with PCl3. In particular, sterically hindered phenolic antioxidants are desirable as premature hydrolysis is less likely. By forming a sterically hindered phenoxy bond with the antioxidant, reaction of the functional group is less likely with both water (which would result in deprotection) or free radicals of the polymer chain, which could prevent crosslinking of the polymer upon exposure to radiation. In some instances, the protected antioxidant can react with hydroperoxy species to prevent those species from damaging the polymer chains, as shown in FIG. 10 where the remainder of the tocopherol molecule is represented by $R_2$.

Figure 11:
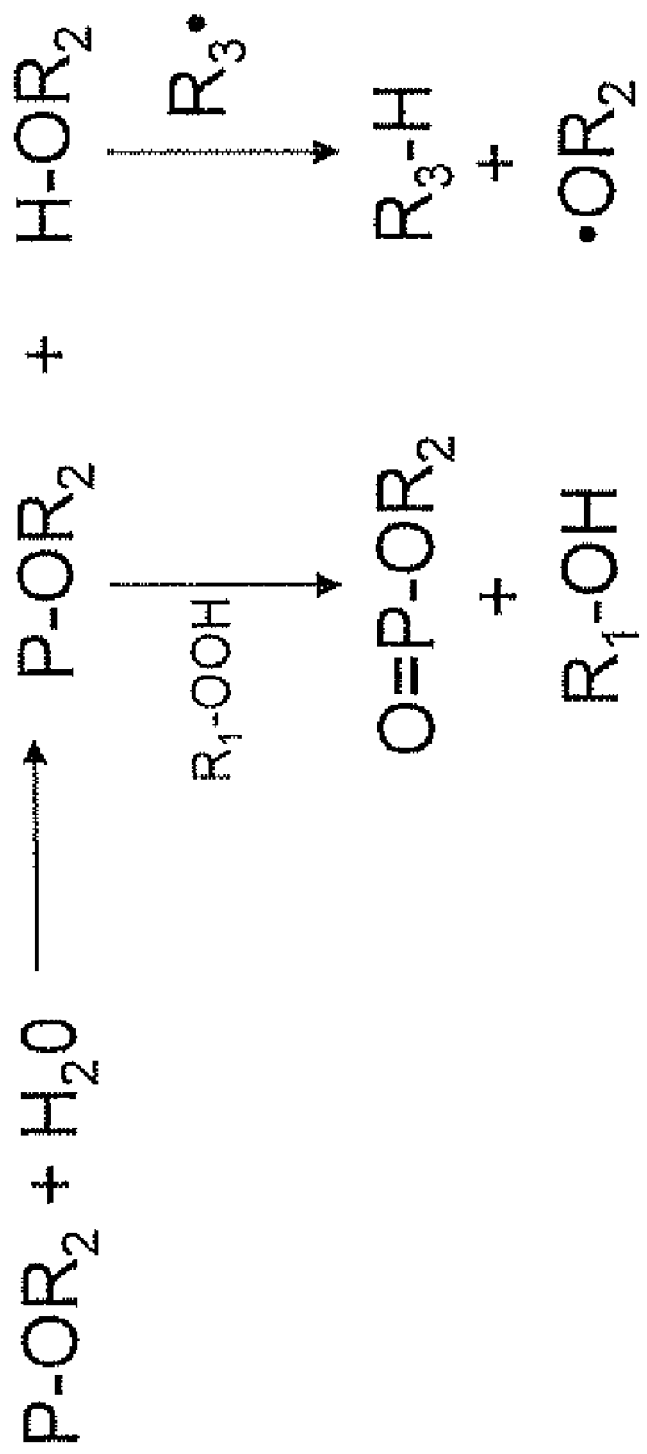
FIG. 11 shows partial hydrolysis of a protected antioxidant and subsequent reaction of protected and deprotected antioxidant with various species, in accordance with certain examples.

In certain embodiments, the phosphite or phosphate antioxidant can also be used as a secondary antioxidant. For example, phosphite antioxidants can act as a secondary antioxidant to stabilize hydroperoxide species formed by the reaction of free radicals with oxygen, e.g., the phosphite antioxidant reacts with a secondary species formed by reaction with the primary free radical species. A primary antioxidant may be used to scavenge the free radicals themselves. In certain instances, it may be desirable to hydrolyze some, but not all, of the phosphite antioxidant such that the deprotected antioxidant (or unprotected antioxidant) can be effective as a primary antioxidant and the protected, phosphite antioxidant can be effective as a secondary antioxidant. In this manner, more reactive species may be scavenged or stabilized, which can reduce the overall degradation of the polymer. This scheme is shown in FIG. 11.

In certain examples, a stabilizer, co-stabilizer or co-antioxidant can be used with the antioxidants described herein. In certain instances, the stabilizer or co-stabilizer can act to stabilize the protected antioxidant itself, whereas in other examples, the stabilizer or co-stabilizer can react more readily with water or other species to prevent degradation of the protected antioxidant. In certain examples, an amine can be used as a stabilizer such that the amine can either react with species or stabilize the protected antioxidant. Illustrative stabilizers include, but are not limited to, 2,2,6,6-tetramethylpiperidine, a tertiary amine, and a metallic soap. Such stabilizers can be particularly desired where low irradiation dose levels are used, e.g., sterilization, which typically do not exceed 40 kGy. Such low radiation dose levels can be used to reduce the level of crosslinking.

In certain embodiments, the protected antioxidants, deprotected antioxidants and unprotected antioxidants can be added to a polymer to provide an antioxidant effect to that polymer. As discussed in more detail below, the antioxidant can be doped into, diffused into, mixed with, blended with, or combined in other manners to impart some antioxidant effect to the resulting combination. The particular polymer selected for use with the antioxidants can depend, at least in part, on the final desired product or article. Illustrative articles and polymers that can be used to produce them are described in more detail below.

In certain embodiments, the composition can include a crosslinkable polymer. The crosslinkable polymer can be any polymer that can be cross-linked using radiation, a chemical crosslinking agent or that can be physically cross-linked under suitable conditions. Those polymers that are crosslinkable using ionization radiation are particularly desirable for use. In some examples, the polymer can be a thermoplastic polymer such as, for example, an acrylonitrile butadiene styrene (ABS) polymer, an acrylic polymer, a celluloid polymer, a cellulose acetate polymer, a cycloolefin copolymer (COC), an ethylene-vinyl acetate (EVA) polymer, an ethylene vinyl alcohol (EVOH) polymer, a fluoroplastic, an ionomer, an acrylic/PVC alloy, a liquid crystal polymer (LCP), a polyacetal polymer (POM or Acetal), a polyacrylate polymer, a polyacrylonitrile polymer (PAN or Acrylonitrile), a polyamide polymer (PA or Nylon), a polyamide-imide polymer (PAI), a polyaryletherketone polymer (PAEK or Ketone), a polybutadiene polymer (PBD), a polybutylene polymer (PB), a polybutylene terephthalate polymer (PBT), a polycaprolactone polymer (PCL), a polychlorotrifluoroethylene polymer (PCTFE), a polyethylene terephthalate polymer (PET), a polycyclohexylene dimethylene terephthalate polymer (PCT), a polycarbonate polymer, a polyhydroxyalkanoate polymer (PHA), a polyketone polymer (PK), a polyester polymer, a polyethylene polymer (PE), a polyetheretherketone polymer (PEEK), a polyetherketoneketone polymer (PEKK), a polyetherimide polymer (PEI), a polyethersulfone polymer (PES), a polyethylenechlorinate polymer (PEC), a polyimide polymer (PI), a polylactic acid polymer (PLA), a polymethylpentene polymer (PMP), a polyphenylene oxide polymer (PPO), a polyphenylene sulfide polymer (PPS), a polyphthalamide polymer (PPA), a polypropylene polymer, a polystyrene polymer (PS), a polysulfone polymer (PSU), a polytrimethylene terephthalate polymer (PTT), a polyurethane polymer (PU), a polyvinyl acetate polymer (PVA), a polyvinyl chloride polymer (PVC), a polyvinylidene chloride polymer (PVDC), and a styrene-acrylonitrile polymer (SAN). The use of polyethylenes may be particularly desirable where the resulting polymer composition is used to provide an implant or other medical or dental device. Illustrative types of polyethylene include, for example, ultra high molecular weight polyethylene (UHMWPE), ultra low molecular weight polyethylene (ULMWPE), high molecular weight polyethylene (HMWPE), high density polyethylene (HDPE), high density cross-linked polyethylene (HDXLPE), cross-linked polyethylene (PEX or XLPE), medium density polyethylene (MDPE), low density polyethylene (LDPE), linear low density polyethylene (LLDPE) and very low density polyethylene (VLDPE). In some examples, a polypropylene can be used. A polypropylene may be particularly desirable where the final product is a mesh, stent, breast implant material, suture material or other medical device. In one alternative, a polypropylene (or other polymer) may be used as one layer in a multi-layered medical device. Illustrative polypropylenes include, but are not limited to, a homopolymeric polypropylene, a block copolymeric polypropylene, and a random copolymeric polypropylene. In certain examples, the polymers used in the compositions described herein can be copolymerized with one or more monomers or polymers.

In certain examples, the crosslinkable polymer can be ultrahigh molecular weight polyethylene (UHMWPE). UHMWPE is a semi crystalline, linear homopolymer of ethylene, which may be produced by stereospecific polymerization with a Ziegler-Natta catalyst at low pressure (6-8 bar) and low temperature (66-80° C.). The synthesis of nascent UHMWPE results in a fine granular powder. The molecular weight and its distribution can be controlled by process parameters such as temperature, time and pressure. UHMWPE generally has a molecular weight of at least about 2,000,000 g/mol. Suitable UHMWPE materials for use as raw materials may be in the form of a powder or mixture of powders. The UHMWPE material may be prepared almost entirely from UHMWPE powder, or may be formed by combining UHMWPE powder with other suitable polymer materials. In one embodiment, the UHMWPE material may include at least about 50 w/w % UHMWPE. Examples of suitable UHMWPE materials include GUR 1020 and GUR 1050 available from Ticona Engineering Polymers. Suitable polymer materials for use in combination with the UHMWPE materials may include disentangled polyethylene, high pressure crystallized polyethylene and various other "super tough" polyethylene derivatives. In addition, biocompatible non-polyethylene polymers may also be suitable for use in certain embodiments.

In certain examples, the compositions may also include suitable additives that impart a desired physical or chemical property. Illustrative suitable additives include, but are not limited to radiopaque materials, antimicrobial materials such as silver ions, antibiotics, and microparticles and/or nanoparticles serving various functions. Preservatives, colorants and other conventional additives may also be used. The polymers, e.g., UHMWPE, may be used with any or more of the antioxidants described herein in protected form, deprotected form, unprotected form or combinations thereof. In certain examples, the polymers, e.g., UHMWPE can be used in combination with a tocopherol phosphite or a tocopherol phosphate.

In certain embodiments, the antioxidant and polymer material may be combined via a number of known processes to form a blend. Such processes include physical mixing, mixing with the aid of a solvent, mixing with the aid of a solvent (e.g. $CO_2$) under supercritical temperature and pressure conditions, and ultrasonic mixing. Suitable mixing processes of these types are also described, for example, in U.S. Pat. Nos. 6,448,315 and 6,277,390, the disclosures of which are hereby incorporated by reference.

In one embodiment, the protected antioxidant can be added directly to the polymer material in the absence of any solvent and mixing may occur for a desired period. In other examples, the protected antioxidant can be added to a solvent to suspend or dissolve the protected antioxidant and the resulting fluid can be combined with the polymer. Such a combination may be performed dropwise, incrementally with or without mixing or by combining an entire amount of a selected volume of antioxidant with a selected amount of polymer. In certain examples, protected antioxidant dissolved in ethanol can be added drop-wise to a powdered UHMWPE material while mixing. The ethanol may then be removed via a vacuum dryer or similar apparatus.

In certain embodiments, the polymer material and the protected antioxidant may be mixed until a substantially uniform distribution of the antioxidant, e.g., in either protected, deprotected or unprotected forms taken together, is present at least at a surface region of the blend. The phrase "surface region" refers to a region of a crosslinked polymer blend extending from a surface of the blend to some depth or range of depths below the surface. For example, implants formed from the crosslinked polymer/antioxidant blend may exhibit a substantially uniform distribution of the antioxidant to a surface depth of at least 3 mm, more particularly, at least 5 mm. Other embodiments may exhibit a substantially uniform distribution of antioxidant to a surface depth of at least 10 mm, more particularly at least 15 mm, even more particularly at least 20 mm. In further embodiments, the crosslinked polymer/antioxidant blend may have a substantially uniform distribution of antioxidant throughout the blend. While the antioxidant may be present in a substantially uniform distribution throughout the blend, various areas of the crosslinked polymer may have one form or another of the antioxidant, e.g., protected versus deprotected form. Thus, specific regions or areas of the crosslinked polymer may include only protected antioxidant, deprotected antioxidant or unprotected antioxidant, whereas other areas or regions may include two or more of these forms.

In certain embodiments, the surface region may include a combination of protected and deprotected antioxidant, protected and unprotected antioxidant, or protected, deprotected and unprotected antioxidant. For example, it may be desirable to include both protected and deprotected antioxidant as secondary and primary antioxidants, respectively. In addition, as deprotected antioxidant is consumed by reaction with free radicals, more of the protected antioxidant can be converted to deprotected antioxidant for use as a primary antioxidant. In certain embodiments, a protected antioxidant having more stability, for example to hydrolysis, can be used such that a slow release of deprotected antioxidant would occur with the rate of release corresponding to conditions such as hygroscopic tendencies of the polymer, thickness, moisture availability, and stability of the protected antioxidant. In other examples, a protected antioxidant having less stability, for example to hydrolysis, can be used such that a faster release of deprotected antioxidant would occur. Stability of the antioxidant can be controlled by selecting the particular group or groups present in the antioxidant, e.g., one way to design in stability is use of more or less hindered phenols or alcohols in combination with tocopherol to synthesize a phosphite, as described herein. Where multiple forms are present, the resulting implant may be treated post-deprotection to add protected or unprotected antioxidant at a desired amount particularly if the deprotection conditions result in deprotection of substantially all of the protected antioxidant. Alternatively, the deprotection conditions may be selected such that both protected and deprotected antioxidant remain present. In certain instances, the surface region of the implant may include a substantially uniform distribution of deprotected antioxidant, and regions below the surface region may include a substantially uniform distribution of protected antioxidant. As deprotected antioxidant at the surface reacts with free radicals, more of the protected antioxidant can be converted to deprotected antioxidant and migrate towards the surface of the polymer to provide effective antioxidant protection.

In other examples, the entire implant may include a combination of protected and deprotected antioxidant, protected and unprotected antioxidant, or protected, deprotected and unprotected antioxidant throughout the polymer. Such antioxidants may be uniformly dispersed throughout the polymer. By including different forms of the antioxidant throughout the polymer, the forms may be able to convert between each other such that an effective amount of primary antioxidant, secondary antioxidant or both are present in the implant over the implant's projected lifetime. In this manner, the overall longevity of the implant may increase, which can result in fewer replacement surgeries and failed implants.

In certain embodiments, during preparation of the polymer composition, combination of techniques may be used including mixing, blending, doping, diffusing and the like to provide a desired gradient, distribution or other arrangement of antioxidant within the polymer. For example, the polymer can first be crosslinked, either in the presence of absence of any protected antioxidant, followed by soaking of the crosslinked polymer in protected antioxidant, deprotected antioxidant or unprotected antioxidant. It may be desirable to crosslink the polymer in the presence of protected antioxidant that has been blended with the polymer and then soak the resulting crosslinked polymer in the presence of an unprotected antioxidant. In this manner, a deprotection step may be omitted, and deprotection of the protected antioxidant can occur gradually in the use environment of the crosslinked polymer composition.

In certain embodiments, the combination of the polymer and protected antioxidant can be exposed to crosslinking conditions such that the polymer chains crosslink to a desired degree. Such crosslinking may take various forms including, but not limited to, using radiation, using a chemical crosslinking agent or using conditions to promote physical crosslinking. In chemical cross-linking processes, a cross-linking agent such as, for example, dicumyl peroxide is blended with the polymer/protected antioxidant combination and heat is applied to promote the cross-linking reaction. In the radiation cross-linking process, the polymer is irradiated with high energy ionizing radiation, and the resulting transfer of energy to the polymer produces cross-linking between the individual polymer chains. In physical cross-linking processes, the linking may take the form of entanglements, crystallites, or hydrogen-bonded structures. One example of physical crosslinking is exposing the polymer composition to freezing and thawing.

In examples where radiation crosslinking is used, the radiation used may be visible light radiation, infrared radiation, ultraviolet radiation, electron beam radiation, gamma radiation, or X-ray radiation. Where ionizing radiation is employed to effect the cross-linking reaction, the radiation can be obtained from any suitable source such as an atomic pile, a resonant transformer accelerator, a Van de Graaff electron accelerator, a Linac electron accelerator, a betatron, a synchrotron, a cyclotron, or the like. Radiation from these sources will produce ionizing radiation such as electrons, protons, neutrons, deuterons, gamma rays, X rays, alpha particles, and beta particles. Where ionizing radiation is used, a sufficient radiation dose rate and/or absorbed dose can be used to induce crosslinking and/or control the degree of crosslinking.

In certain examples, the use of electron beam radiation may be particularly desirable to provide an implant having desired physical properties. Electron beam radiation exposure may be performed using conventionally available electron beam accelerators. One commercial source for such an accelerator is IBA Technologies Group, Belgium. Suitable accelerators may produce an electron beam energy between about 2 and about 50 MeV, more particularly about 10 MeV, and are generally capable of accomplishing a selected radiation dose and/or dosage rate. Electron beam exposure may be carried out in a generally inert atmosphere, including for example, an argon, nitrogen, vacuum, or oxygen scavenger atmosphere. Exposure may also be carried out in air under ambient conditions.

In certain examples, crosslinking may also be performed in the presence of an additive that can promote or deter crosslinking, depending on the desired level of crosslinking in the final polymer. Illustrative crosslinking promoters include, but are not limited to, trimethylolpropane triacrylate, trimethylolpropane trimethacrylate, pentaerythritol tetraacrylate, and pentaerythritol tetramethacrylate. In certain instances, unprotected antioxidant or deprotected antioxidant can be present to reduce the degree of crosslinking. Alternatively, other reagents that can scavenge free radicals can be present to reduce the degree of crosslinking in the polymer composition.

In certain examples, crosslinking can take place in an organic solvent to prevent premature deprotection of the protected antioxidant. Alternatively, a protecting agent can be added directly to the antioxidant, which tends to be oily or hydrophobic to at least some degree, such that the protected antioxidant is shielded from moisture. Non-desired products can be separated through extraction or vacuum evaporation. After a suitable reaction time, the mixture can be crosslinked using ionizing radiation. The resulting cross-linked polymeric composition can then be exposed to an aqueous solution to deprotect at least some of the protected antioxidant or post-crosslinking processing such as, for example, soaking, dipping, molding, annealing, etc. may be performed as desired.

In certain examples, prior to and/or after crosslinking, the polymer/antioxidant composition may be subjected to one or more temperature treatments. In one embodiment, the composition may be heated above room temperature, more particularly above about 100° C., even more particularly between about 120° C. and 130° C. Where heat treatment occurs, the heat treatment can be below, at or above the melt temperature of the polymer. In certain embodiments, it may be desirable to heat treat the polymer/antioxidant composition below the melt temperature. In other examples, the polymer composition can remain at room temperature or be cooled below room temperature, for example, below the glass transition temperature of the polymer composition.

In certain embodiments, after irradiation the polymer composition can be annealed by exposure to heat. Alternatively or additionally, the crosslinked polymer composition can be subjected to the mechanical annealing processes reported in U.S. Pat. No. 6,853,772 to Muratoglu, which is hereby incorporated by reference. In one embodiment, however, no pre- or post-irradiation temperature and/or annealing treatments are performed.

In certain examples, one or more agents, e.g., bioactive agents, can be added to the polymer composition. Such addition can be accomplished during any stage of preparation but may be desirable after any heat treatments are performed to reduce the likelihood of deactivation of the bioactive agent. Illustrative agents include, but are not limited to, an antibiotic, a steroid, a drug, a growth factor such as bone morphogenic protein, an osteocyte, an osteoclast or other cells, a vitamin, a chondroitin, a glucosamine, a glycosoaminglycan, high energy phosphates such as phosphoenolpyruvate, ATP, 5'-AMP and other small molecule biologics or other chemical or biological agents. In some examples, the polymer composition may be loaded with stem cells, and the polymer composition can act as a scaffold to permit growth and differentiation of bone or cartilage within the polymer framework. The presence of a protected/deprotected antioxidant in the polymer composition can act to prevent degradation of the scaffold in its use environment and may also provide some oxidative protection to the bioactive agent or stem cells loaded into the scaffold.

In certain examples, subsequent to or after production of the crosslinked polymer composition, the composition may be molded, compressed, consolidated or otherwise processed to provide a desired shape, part size or other physical attributes to render the part suitable for its intended use. Such processing may take place in a low humidity and low oxygen environment to prevent premature oxidation of the part. In some instances, processing can be combined with exposure to high humidity levels to promote deprotection of the protected antioxidant.

In certain embodiments, additional components may be combined with the polymer composition at any time during the process. In one embodiment, tribological components such as metal and/or ceramic articulating components and/or preassembled bipolar components may be joined with the polymer composition. In other embodiments, metal backing (e.g. plates or shields) may be added. In further embodiments, surface components such a trabecular metal, fiber metal, Sulmesh® coating, meshes, cancellous titanium, and/or metal or polymer coatings may be added to or joined with the polymer composition. Still further, radiomarkers or radiopacifiers such as tantalum, steel and/or titanium balls, wires, bolts or pegs may be added. Further yet, locking features such as rings, bolts, pegs, snaps and/or cements/adhesives may be added. These additional components may be used to form sandwich implant designs, radiomarked implants, metal-backed implants to prevent direct bone contact, functional growth surfaces, and/or implants with locking features. Additional suitable components for combining with the polymer compositions described herein to provide an implant having a desired physical structure and/or desired physical features will be readily selected by the person of ordinary skill in the art, given the benefit of this disclosure.

In certain embodiments, the compositions described herein include a pre-crosslinked polymer, e.g., UHMWPE and a protected antioxidant. In some examples, the protected antioxidant is uniformly dispersed throughout the pre-crosslinked polymer to provide a blend of pre-crosslinked polymer and protected antioxidant. In certain instances, the polymer may be crosslinked in the presence of the protected antioxidant. As described herein, deprotection can be accomplished post-crosslinking to provide a deprotected antioxidant within the crosslinked polymer. In certain instances, deprotection can provide a mixture of deprotected antioxidant and protected antioxidant. In some examples, the antioxidant is protected with a phosphite or a phosphate group. In certain instances where a phosphite or phosphate group is present, the antioxidant may be a tocotrienol, a tocopherol, combinations thereof or one or more other antioxidants described herein. In some examples, the protected antioxidant and the deprotected antioxidant can be present in the polymer composition at a ratio of about 5:1, 4:1, 3:1, 2:1, 1:1, 1:2, 1:3, 1:4, or 1:5. In certain instances, the polymer composition may also include an unprotected antioxidant. In some examples, the unprotected antioxidant and the protected antioxidant have the same base chemical structure, e.g., both are based on Vitamin E, whereas in other instances the protected antioxidant can have a different base structure than the unprotected antioxidant, e.g., the protected antioxidant can be vitamin E phosphite and the unprotected antioxidant can be a tocotrienol, carotene or other antioxidant.

In certain embodiments, the compositions described herein include pre-crosslinked polymer, e.g., UHMWPE, and an antioxidant mixture comprising a protected antioxidant and an unprotected antioxidant. In some examples, the antioxidant mixture is dispersed throughout the pre-crosslinked polymer to provide a blend of pre-crosslinked polymer and antioxidant mixture. In certain instances, the polymer may be crosslinked in the presence of the protected antioxidant and the unprotected antioxidant. As described herein, deprotection can be accomplished post-crosslinking to provide a deprotected antioxidant within the crosslinked polymer. In certain instances, deprotection can provide a mixture of deprotected antioxidant, protected antioxidant and unprotected antioxidant. In some examples, the antioxidant is protected with a phosphite or a phosphate group. In certain instances where a phosphite or phosphate group is present, the antioxidant may be a tocotrienol, a tocopherol, combinations thereof or one or more other antioxidants described herein. In some examples, the protected antioxidant and the unprotected antioxidant can be present in the polymer composition at a ratio of about 5:1, 4:1, 3:1, 2:1, 1:1, 1:2, 1:3, 1:4, or 1:5. In some examples, the unprotected antioxidant and the protected antioxidant have the same base chemical structure, e.g., both are based on Vitamin E, whereas in other instances, the protected antioxidant can have a different base structure than the unprotected antioxidant, e.g., the protected antioxidant can be vitamin E phosphite and the unprotected antioxidant can be a tocotrienol, carotene or other antioxidant.

In certain examples, the polymer compositions described herein can include a blend of a polymer, e.g., UHMWPE, and an antioxidant mixture comprising a protected antioxidant and a deprotected antioxidant, the blend comprising a substantially uniform distribution of the antioxidant mixture in the polymer. In certain examples, the protected antioxidant comprises a phosphite protecting group or a phosphate protecting group. In certain instances where a phosphite or phosphate group is present, the antioxidant may be a tocotrienol, a tocopherol, combinations thereof or one or more other antioxidants described herein. In some examples, the protected antioxidant and the deprotected antioxidant can be present in the polymer composition at a ratio of about 5:1, 4:1, 3:1, 2:1, 1:1, 1:2, 1:3, 1:4, or 1:5. In some embodiments, the antioxidant mixture further comprises an unprotected antioxidant. In certain examples, the unprotected antioxidant and the protected antioxidant have the same base chemical structure, e.g., both are based on Vitamin E, whereas in other instances, the protected antioxidant can have a different base structure than the unprotected antioxidant, e.g., the protected antioxidant can be vitamin E phosphite and the unprotected antioxidant can be a tocotrienol, carotene or other antioxidant.

In certain embodiments, the polymer compositions described herein can include a blend of a polymer, e.g., UHMWPE, and an antioxidant mixture comprising a protected antioxidant and an unprotected antioxidant, the blend comprising a substantially uniform distribution of the antioxidant mixture in the polymer. In certain examples, the protected antioxidant comprises a phosphite protecting group or a phosphate protecting group. In certain instances where a phosphite or phosphate group is present, the antioxidant may be a tocotrienol, a tocopherol, combinations thereof or one or more other antioxidants described herein. In some examples, the protected antioxidant and the unprotected antioxidant can be present in the polymer composition at a ratio of about 5:1, 4:1, 3:1, 2:1, 1:1, 1:2, 1:3, 1:4, or 1:5. In certain examples, the unprotected antioxidant and the protected antioxidant have the same base chemical structure, e.g., both are based on Vitamin E, whereas in other instances, the protected antioxidant can have a different base structure than the unprotected antioxidant, e.g., the protected antioxidant can be vitamin E phosphite and the unprotected antioxidant can be a tocotrienol, carotene or other antioxidant. In certain embodiments, the antioxidant mixture may further comprise deprotected antioxidant.

In certain examples, a method of making a polymer composition can include mixing a polymer, e.g., UHMWPE, and a protected antioxidant, and exposing the mixed polymer and protected antioxidant to radiation to crosslink the polymer. In certain embodiments, the method can include converting at least some of the protected antioxidant to a deprotected antioxidant. In other embodiments, the method can include, prior to the exposing step, mixing the polymer and the protected antioxidant to provide a blend comprising a substantially uniform distribution of the protected antioxidant throughout the polymer. In certain embodiments, the exposing step comprises exposing the mixed polymer and protected antioxidant to gamma radiation. In other embodiments, the exposing step comprises exposing the mixed polymer and protected antioxidant to electron beam radiation. In additional embodiments, the method can include mixing a deprotected antioxidant with the polymer and the protected antioxidant. In certain instances, the antioxidant of the protected antioxidant and the antioxidant of the deprotected antioxidant are the same base antioxidant. In certain examples, the protected antioxidant and the deprotected antioxidant are present in a ratio of about 5:1, 4:1, 3:1, 2:1, 1:1, 1:2, 1:3, 1:4, or 1:5. In certain embodiments, the method can also include consolidating, prior to the exposing step, the mixed polymer and protected antioxidant. In other embodiments, the exposing step may be performed prior to consolidation and the consolidation may occur after the exposing step.

In certain embodiments, a method of preparing a polymer composition can include doping a protected antioxidant into a polymer, e.g., UHMWPE, to provide a gradient of the protected antioxidant in the polymer. In some examples, the method can include crosslinking the polymer prior to doping with the protected antioxidant. In certain embodiments, the method can include crosslinking the polymer in the presence of the protected antioxidant and then doping the crosslinked polymer with the protected antioxidant to provide the gradient of protected antioxidant. In other embodiments, the method can include doping the polymer with an unprotected antioxidant.

In certain examples, a method of preparing a polymer composition can include mixing a polymer, e.g., UHMWPE, and an antioxidant mixture comprising a protected antioxidant and an unprotected antioxidant, and exposing the mixed polymer and antioxidant mixture to radiation to crosslink the polymer. In some embodiments, the method can include converting at least some of the protected antioxidant to a deprotected antioxidant. In additional embodiments, the method can include mixing the polymer and the antioxidant mixture to provide a blend comprising a substantially uniform distribution of the antioxidant mixture throughout the polymer. In other examples, the method can include exposing the mixed polymer and antioxidant mixture to gamma radiation to crosslink the polymer. In certain examples, the method can include exposing the mixed polymer and antioxidant mixture to electron beam radiation to crosslink the polymer. In certain examples, the method can include mixing a deprotected antioxidant with the polymer. In some examples, the antioxidant of the protected antioxidant and the antioxidant of the deprotected antioxidant comprise the same base antioxidant. In certain examples, the protected antioxidant and the deprotected antioxidant are present in a ratio of about 5:1, 4:1, 3:1, 2:1, 1:1, 1:2, 1:3, 1:4, or 1:5. In certain embodiments, the method can also include consolidating, prior to the exposing step, the mixed polymer and antioxidant mixture. In other embodiments, the exposing step may be performed prior to consolidation and the consolidation may occur after the exposing step.

In certain embodiments, a method of preparing a polymer composition can include mixing a polymer, e.g., UHMWPE, and an antioxidant mixture comprising a protected antioxidant and a deprotected antioxidant, and exposing the mixed polymer and antioxidant mixture to radiation to crosslink the polymer. In certain examples, the method can include converting at least some of the protected antioxidant to deprotected antioxidant after the exposing step. In additional examples, the method can include mixing the polymer, and the antioxidant mixture to provide a blend comprising a substantially uniform distribution of the antioxidant mixture throughout the polymer. In other examples, the exposing step comprises exposing the polymer and the antioxidant mixture to gamma radiation. In certain examples, the exposing step comprises exposing the polymer and the antioxidant mixture to electron beam radiation. In some examples, the method comprises mixing an unprotected antioxidant with the polymer. In certain examples, the antioxidant of the protected antioxidant and the antioxidant of the unprotected antioxidant comprise the same base antioxidant. In additional examples, the protected antioxidant and the unprotected antioxidant are present in a ratio of about 5:1, 4:1, 3:1, 2:1, 1:1, 1:2, 1:3, 1:4, or 1:5. In some examples, the method can include consolidating, prior to the exposing step, the mixed polymer and antioxidant mixture. In certain examples, the method can include converting at least some of the protected antioxidant to deprotected antioxidant after the exposing step. In additional examples, the method can include consolidating the mixed polymer and antioxidant mixture after the exposing step.

In certain embodiments, a method of facilitating production of an implant includes providing a polymer, e.g., UHMWPE, and providing a protected antioxidant. In some examples, the method includes providing instructions for mixing the polymer and the protected antioxidant to provide a substantially uniform distribution of the protected antioxidant in the polymer. In other examples, the method includes providing instructions for exposing the polymer and the protected antioxidant to radiation to crosslink the polymer. In additional examples, the method includes providing instructions to convert at least some of the protected antioxidant to a deprotected antioxidant. In other embodiments, the method includes providing a deprotected antioxidant. In some examples, the method includes providing instructions for doping the protected antioxidant in the polymer, and providing instructions for exposing the polymer comprising the doped protected antioxidant to radiation to crosslink the polymer. In certain examples, the method includes providing instructions for consolidating the mixed polymer and the protected antioxidant, providing instructions for exposing the polymer and the protected antioxidant to radiation to crosslink the consolidated polymer, and providing instructions for converting at least some of the protected antioxidant to a deprotected antioxidant.

In certain embodiments, a method of facilitating production of an implant includes providing a polymer, e.g., UHMWPE, providing a protecting agent, and providing instructions for using the protecting agent to provide a protected antioxidant for use with the polymer. In certain examples, the method can include providing the antioxidant. In some examples, the method can include providing instructions for mixing the polymer and the protected antioxidant to provide a substantially uniform distribution of the protected antioxidant in the polymer. In certain embodiments, the method can include providing instructions for exposing the polymer and the protected antioxidant to radiation to crosslink the polymer, and providing instructions to convert at least some of the protected antioxidant to a deprotected antioxidant. In other examples, the method can include providing a deprotected antioxidant. In some embodiments, the method can include providing instructions for doping the protected antioxidant in the polymer, and providing instructions for exposing the polymer comprising the doped protected antioxidant to radiation to crosslink the polymer. In certain embodiments, the method can include providing instructions for consolidating the mixed polymer and the protected antioxidant, providing instructions for exposing the consolidated polymer and the protected antioxidant to radiation to crosslink the consolidated polymer, and providing instructions for converting at least some of the protected antioxidant to a deprotected antioxidant.

In certain embodiments, a method can include combining ultrahigh molecular weight polyethylene and a protected antioxidant to provide a blend, consolidating the blend of ultrahigh molecular weight polyethylene and a protected antioxidant, and exposing the consolidated blend of ultrahigh molecular weight polyethylene and a protected antioxidant to radiation to crosslink the ultrahigh molecular weight polyethylene. In some examples, the method can include converting at least some of the protected antioxidant to deprotected antioxidant. In certain examples, the protected antioxidant is a tocopherol phosphite.

In other embodiments, a method can include combining ultrahigh molecular weight polyethylene and a protected antioxidant to provide a blend, exposing the blend of ultrahigh molecular weight polyethylene and a protected antioxidant to radiation to crosslink the ultrahigh molecular weight polyethylene, and consolidating the crosslinked blend of ultrahigh molecular weight polyethylene and a protected antioxidant. In some examples, the method can include converting at least some of the protected antioxidant to deprotected antioxidant. In certain examples, the protected antioxidant is a tocopherol phosphite.

In certain examples, a method of preparing a polymer composition can include reacting an antioxidant, e.g., vitamin E, with a protecting agent, e.g., $PCl_3$, to provide a protected antioxidant, e.g., vitamin E phosphite, combining the protected antioxidant with a polymer, e.g., UHMWPE, consolidating the combined polymer and protected antioxidant, and crosslinking the consolidated polymer and protected antioxidant. In some examples, the method can include converting at least some of the protected antioxidant to deprotected antioxidant. In other examples, the method can include adding an unprotected antioxidant to the polymer, either before or after consolidation or crosslinking.

In certain examples, a method of preparing a polymer composition can include reacting an antioxidant, e.g., vitamin E, with a protecting agent, e.g., $PCl_3$, to provide a protected antioxidant, e.g., vitamin E phosphite, combining the protected antioxidant with a polymer, e.g., UHMWPE, crosslinking the consolidated polymer and protected antioxidant, and consolidating the crosslinked polymer and protected antioxidant. In some examples, the method can include converting at least some of the protected antioxidant to deprotected antioxidant. In other examples, the method can include adding an unprotected antioxidant to the polymer, either before or after crosslinking or consolidation.

In certain examples, a method of producing an implant can include combining a protected antioxidant, e.g., vitamin E phosphite, with a polymer, e.g., UHMWPE, consolidating the combined polymer and protected antioxidant, crosslinking the consolidated polymer and protected antioxidant, and forming an implant from the crosslinked polymer and protected antioxidant. In some examples, the method can include converting at least some of the protected antioxidant in the implant to deprotected antioxidant. In other examples, the method can include adding an unprotected antioxidant to the polymer, either before or after consolidation or crosslinking or implant formation.

In certain examples, a method of producing an implant can include, combining a protected antioxidant, e.g., vitamin E phosphite, with a polymer, e.g., UHMWPE, crosslinking the consolidated polymer and protected antioxidant, consolidating the crosslinked polymer and protected antioxidant, and forming the implant from the consolidated and crosslinked polymer and protected antioxidant. In some examples, the method can include converting at least some of the protected antioxidant in the implant to deprotected antioxidant. In other examples, the method can include adding an unprotected antioxidant to the polymer, either before or after crosslinking or consolidation or implant formation.

In certain examples, a composition produced by combining a polymer, e.g., UHMWPE, and a protected antioxidant, e.g., vitamin E phosphite, and exposing the polymer and protected antioxidant to radiation to crosslink the polymer is disclosed. In certain embodiments, the composition may be produced by converting at least some of the protected antioxidant to a deprotected antioxidant.

In certain embodiments, an article may include a pre-crosslinked polymer, e.g., pre-crosslinked UHMWPE, and a protected antioxidant, e.g., vitamin E phosphite. In some embodiments, an article may include a partially crosslinked polymer, e.g., partially crosslinked UHMWPE, and a protected antioxidant. In other embodiments, an article may include a crosslinked polymer, e.g., crosslinked UHMWPE, and a protected antioxidant. In certain examples, the protected antioxidant is present in a substantially uniform distribution in the pre-crosslinked, partially crosslinked or crosslinked polymer. In other examples, the article can include an unprotected antioxidant. In additional examples, the article can include deprotected antioxidant. In yet other examples, the article can include an additional component joined to the article to form an implant. In some examples, the article comprises at least portions of an artificial hip, hip liner, knee, knee liner, disk replacement, shoulder, elbow, foot, ankle, finger, mandible or bearings in artificial heart.

The technology described herein can provide certain advantages, depending on the exact configuration of the polymer compositions including, for example, improved oxidation stability of the polymer, lower color formation, permits the use of lower radiation levels for an equivalent level of crosslinking, is capable of stabilizing hydroperoxide species as well as free radical species, and permits higher loading rates of antioxidant with less inhibition of crosslinking, which can provide better long term oxidative stability. Thus, it may be possible to crosslink the polymer compositions disclosed herein using radiation doses commonly used for sterilization, e.g., 25-40 kGy, rather than the higher doses typically used in crosslinking processes, e.g., 50-200 kGy.

Certain specific examples are described in more detail below to illustrate further some of the aspects and features of the technology described herein.

Example 1

A tocopherol phosphite was synthesized by the addition of $PCl_3$ to approximately 10% excess of d,l-α-tocopherol dissolved in dichloromethane, with triethylamine added at a slight excess as an acid acceptor. Fisher HPLC grade dichloromethane and Sigma-Aldrich triethylamine, assay≧99%, were dried over activated molecular sieves prior to use. DSM synthetic all racemic d,l-α-tocopherol and Aldrich grade reagent-plus $PCl_3$, assay≧99%, were used as received. A dry 100 mL three neck schlenk style flask containing a magnetic stir bar was fitted with a gas inlet and addition funnel. The flask was charged with $3.78 \times 10^{-2}$ mole (16.29 g) of d,l-α-tocopherol. The tocopherol was dissolved under a dry nitrogen purge with 15 mL of dichloromethane. A slight excess of triethylamine (based on $PCl_3$) was added to the solution by pipeting 5 mL into the flask (about $3.59 \times 10^{-2}$ mole) under dry purge with stirring. The $PCl_3$ was added by pipeting 1 mL ($1.146 \times 10^{-2}$ mole) under dry purge into about 10 mL of dichloromethane, then adding the diluted solution dropwise to the reaction flask with stirring under dry purge. A white precipitate began forming immediately. The schlenk style addition funnel used for the $PCl_3$ addition was rinsed into the reaction flask with three additional 5 mL aliquots of dichloromethane to insure complete transfer of the $PCl_3$. The slurry was stirred for one hour at ambient temperature under dry purge, followed by slow heating to 40° C. with a reflux condenser attached to the flask. The mixture was allowed to cool to ambient temperature, after which the precipitate was removed under dry purge and/or vacuum by filtration with a schlenk style filter fitted with a 25-50 micron glass frit disc. The single neck 100 mL collection flask used to collect the product solution was fitted with a distillation adapter, water chilled condenser, vacuum adapter and a 50 mL collection flask. The filtered solution was then slowly heated under dry purge to 100° C. and held overnight to remove the dichloromethane and other residual non-reacted volatiles. The remaining product contained some residual precipitate, which was removed with hot (100° C.) filtration under vacuum and/or inert dry purge using a schlenk filter fitted with a 25-50 micron glass frit disc. The product was a clear viscous amber liquid. The HCl-triethylamine salt precipitate byproduct was removed by filtration. The synthesis was conducted with about 10% excess vitamin E to drive the reaction to completion.

A $^1$H-decoupled $^{31}$P nuclear magnetic resonance spectrum of the resulting tocopherol phosphite (in deuterated dichloromethane, ambient temperature and without spinning) is shown in FIG. 12. The spectrum showed a dominant signal around 147.8 ppm. Small signals at 0.9 ppm and a signal at −13.9 ppm were also observed. The results were consistent with there being a single phosphorous compound present in the sample. The chemical shift value of the resulting peak was consistent with the range expected for an aryl phosphite ester (around 140-150 ppm).

Example 2

The tocopherol phosphite from Example 1 was doped into UHMWPE powder followed by consolidation of the polymer composition into small molded pucks. The pucks were irradiated with 100 kGy e-beam radiation. Crosslink density and oxidation induction time (OIT) were determined and compared to using unmodified vitamin E. OIT is a qualitative assessment of the level (or degree) of stabilization of the material tested.

Test results for a 0.2 weight percent addition of antioxidant are shown in Table 1. Both crosslink density and oxidation induction time increased using the tocopherol phosphite as compared to unmodified vitamin E.

TABLE 1

|  |  | Antioxidant | |
| --- | --- | --- | --- |
|  | Test method | d,I-α-tocopherol | d,I-α-tocopherol phosphite |
| cross link density, mol/dm$^3$ | ASTM F2214 | 0.09 | 0.15 |
| Oxidation Induction Time, min. @ 200° C. | ASTM D3895 | 31 | 37 |

Example 3

The tocopherol phosphite from Example 1 is blended with UHMWPE powder prior to consolidation, under moisture controlled conditions to prevent premature hydrolysis. The phosphite and UHMWPE can be dissolved in a suitable dry, organic solvent to promote uniform distribution. The solvent can then be removed prior to or after blending of the phosphite and the UHMWPE to obtain a substantially uniform distribution of the phosphite throughout the UHMWPE. The blended powder is consolidated by compression molding or ram-extrusion or other means to provide for fusion of the blended material. The consolidation can be conducted in a low oxygen and low moisture environment to prevent premature oxidation of the material and to prevent premature hydrolysis of the phosphite. The article is then crosslinked by ionizing radiation such as gamma or electron beam radiation, which can also be performed using low moisture conditions. After crosslinking, the molded article can be subjected to humid conditions or water to promote at least some hydrolysis of the phosphite to provide free tocopherol.

Example 4

A composition can be produced according to Example 3 along with another antioxidant. A hindered amine stabilizer such as, for example, 2,2,6,6,-tetramethylpiperidine, can be added to the UHMWPE powder along with the tocopherol phosphite, prior to consolidation and under moisture controlled conditions to prevent premature hydrolysis. The phosphite, hindered amine stabilizer and UHMWPE can be dissolved in a suitable dry, organic solvent to promote uniform distribution. The solvent can then be removed prior to or after blending of the phosphite, stabilizer and the UHMWPE to obtain a substantially uniform distribution of the phosphite in the UHMWPE. The blended powder is consolidated by compression molding or ram-extrusion or other means to provide for fusion of the blended material. The consolidation can be conducted in a low oxygen and low moisture environment to prevent premature oxidation of the material and to prevent premature hydrolysis of the phosphite. The article is then crosslinked by ionizing radiation such as gamma or electron beam radiation, which can also be performed using low moisture conditions. After crosslinking, the molded article can be subjected to humid conditions or water to promote at least some hydrolysis of the phosphite to provide free tocopherol and hindered stabilizer as antioxidants.

Example 5

A polymer composition can be produced using a tocotrienol phosphite. A tocotrienol is reacted with $PCl_3$ to provide a tocotrienol phosphite. The HCl byproduct can be removed using a vacuum. The tocotrienol phosphite is blended with UHMWPE powder prior to consolidation, under moisture controlled conditions to prevent premature hydrolysis. The phosphite and UHMWPE can be dissolved in a suitable dry, organic solvent to promote uniform distribution. The solvent can then be removed prior to or after blending of the phosphite and the UHMWPE to obtain a substantially uniform distribution of the phosphite in the UHMWPE. The blended powder is consolidated by compression molding or ram-extrusion or other means to provide for fusion of the blended material. The consolidation can be conducted in a low oxygen and low moisture environment to prevent premature oxidation of the material and to prevent premature hydrolysis of the phosphite. The article is then crosslinked by ionizing radiation such as gamma or electron beam radiation, which can also be performed using low moisture conditions. After crosslinking, the molded article can be subjected to humid conditions or water to promote at least some hydrolysis of the phosphite to provide free tocotrienol.

Example 6

A polymer composition can be produced using protected flavonol. Each of the hydroxyl groups on the flavonol can be protected with a phosphite group or with other suitable protecting groups. The protected flavonol is mixed or blended with a polymer, e.g., UHMWPE powder, prior to consolidation. The protected flavonol and polymer can be dissolved in a suitable dry, organic solvent to promote uniform distribution. The solvent can then be removed prior to or after blending of the protected flavonol and the polymer. The blended powder is consolidated by compression molding or ram-extrusion or other means to provide for fusion of the blended material. The article is then crosslinked by ionizing radiation such as gamma or electron beam radiation, which can also be performed using low moisture conditions. After crosslinking, the molded article can be subjected to humid conditions or other conditions, e.g., acid or basic solutions, to deprotect the flavonol and provide at least some free flavonol.

Example 7

A polymer composition can be produced using protected enterodiol. Each of the hydroxyl groups on the enterodiol can be protected with a phosphite group or with other suitable protecting groups. The protected enterodiol is mixed or blended with a polymer, e.g., UHMWPE powder, prior to consolidation. The protected enterodiol and polymer can be dissolved in a suitable dry, organic solvent to promote uniform distribution of the protected enterodiol in the polymer. The solvent can then be removed prior to or after blending of the protected enterodiol and the polymer to obtain a substantially uniform distribution. The blended powder is consolidated by compression molding or ram-extrusion or other means to provide for fusion of the blended material. The article is then crosslinked by ionizing radiation such as gamma or electron beam radiation, which can also be performed using low moisture conditions. After crosslinking, the molded article can be subjected to humid conditions or other conditions, e.g., acid or basic solutions, to deprotect the enterodiol and provide at least some free enterodiol.

Example 8

A polymer composition can be produced using coenzyme Q10. Existing methyl groups protect the hydroxyl groups on the coenzyme Q10. Native coenzyme Q10 is mixed or blended with a polymer, e.g., UHMWPE powder, prior to consolidation. The coenzyme Q10 and polymer can be dissolved in a suitable dry, organic solvent to promote uniform distribution. The solvent can then be removed prior to or after blending of the coenzyme Q10 and the polymer. The blended powder is consolidated by compression molding or ram-extrusion or other means to provide for fusion of the blended material. The article is then crosslinked by ionizing radiation such as gamma or electron beam radiation, which can also be performed using low moisture conditions. After crosslinking, the molded article can be subjected to a strong nucleophile such as, for example, thiophenol/triethylamine, to remove the methyl groups and provide free hydroxyl groups that can provide antioxidant effects.

Example 9

A polymer composition can be produced using protected vitamin K1. The carbonyl groups of vitamin K1 can be protected with a protecting group such as, for example, an acetal or a ketal. Protected vitamin K1 is mixed or blended with a polymer, e.g., UHMWPE powder, prior to consolidation. The protected vitamin K1 and polymer can be dissolved in a suitable dry, organic solvent to promote uniform distribution. The solvent can then be removed prior to or after blending of the protected vitamin K1 and the polymer. The blended powder is consolidated by compression molding or ram-extrusion or other means to provide for fusion of the blended material. The article is then crosslinked by ionizing radiation such as gamma or electron beam radiation, which can also be performed using low moisture conditions. After crosslinking, the molded article can be subjected to acidic conditions to remove the acetal or ketal protecting group and provide at least some free vitamin K1.

Example 10

A polymer composition can be produced using protected glutathione. The terminal hydroxyl groups can be protected by addition of an acetyl group or other protecting groups. Protected glutathione is mixed or blended with a polymer, e.g., UHMWPE powder, prior to consolidation. The protected glutathione and polymer can be dissolved in a suitable dry, organic solvent to promote uniform distribution. The solvent can then be removed prior to or after blending of the protected glutathione and the polymer. The blended powder is consolidated by compression molding or ram-extrusion or other means to provide for fusion of the blended material. The article is then crosslinked by ionizing radiation such as gamma or electron beam radiation, which can also be performed using low moisture conditions. After crosslinking, the molded article can be subjected to acidic conditions to remove the acetal or ketal protecting group and provide at least some free glutathione.

Example 11

Tocopherol phosphite is blended with UHMWPE powder prior to consolidation, under moisture controlled conditions to prevent premature hydrolysis. The phosphite and UHMWPE can be dissolved in a suitable dry, organic solvent to promote uniform distribution. The solvent can then be removed prior to or after blending of the phosphite and the UHMWPE to obtain a substantially uniform distribution of the phosphite throughout the UHMWPE. The blended powder is consolidated by compression molding or ram-extrusion or other means to provide for fusion of the blended material. The consolidation can be conducted in a low oxygen and low moisture environment to prevent premature oxidation of the material and to prevent premature hydrolysis of the phosphite. The article is then crosslinked by addition of a chemical cross-linking agent such as an organic peroxide, silane or azo initiator. Where desired, the resulting mixture can be exposed to light or heat to initiate or assist cross-linking. After crosslinking, the molded article can be subjected to humid conditions or water to promote at least some hydrolysis of the phosphite to provide at least some free tocopherol.

Example 12

A tocotrienol phosphite is blended with UHMWPE powder prior to consolidation, under moisture controlled conditions to prevent premature hydrolysis. The phosphite and UHMWPE can be dissolved in a suitable dry, organic solvent to promote uniform distribution. The solvent can then be removed prior to or after blending of the phosphite and the UHMWPE to obtain a substantially uniform distribution of the phosphite throughout the UHMWPE. The blended powder is consolidated by compression molding or ram-extrusion or other means to provide for fusion of the blended material. The consolidation can be conducted in a low oxygen and low moisture environment to prevent premature oxidation of the material and to prevent premature hydrolysis of the phosphite. The article is then crosslinked by addition of a chemical cross-linking agent such as an organic peroxide, silane or azo initiator. Where desired, the resulting mixture can be exposed to light or heat to initiate or assist cross-linking. After crosslinking, the molded article can be subjected to humid conditions or water to promote at least some hydrolysis of the phosphite to provide at least some free tocotrienol.

Example 13

Tocopherol phosphite is blended with UHMWPE powder prior to consolidation, under moisture controlled conditions to prevent premature hydrolysis. The phosphite and UHMWPE can be dissolved in a suitable dry, organic solvent to promote uniform distribution. The solvent can then be removed prior to or after blending of the phosphite and the UHMWPE to obtain a substantially uniform distribution of the phosphite throughout the UHMWPE. The blended powder is consolidated by compression molding or ram-extrusion or other means to provide for fusion of the blended material. The consolidation can be conducted in a low oxygen and low moisture environment to prevent premature oxidation of the material and to prevent premature hydrolysis of the phosphite. The article is then physically crosslinked by exposure to multiple temperature cycles, e.g., freeze and thaw cycles. After physical crosslinking, the molded article can be subjected to humid conditions or water to promote at least some hydrolysis of the phosphite to provide at least some free tocopherol.

Example 14

A tocotrienol phosphite is blended with UHMWPE powder prior to consolidation, under moisture controlled conditions to prevent premature hydrolysis. The phosphite and UHMWPE can be dissolved in a suitable dry, organic solvent to promote uniform distribution. The solvent can then be removed prior to or after blending of the phosphite and the UHMWPE to obtain a substantially uniform distribution of the phosphite throughout the UHMWPE. The blended powder is consolidated by compression molding or ram-extrusion or other means to provide for fusion of the blended material. The consolidation can be conducted in a low oxygen and low moisture environment to prevent premature oxidation of the material and to prevent premature hydrolysis of the phosphite. The article is then physically crosslinked by exposure to multiple temperature cycles, e.g., freeze and thaw cycles. After crosslinking, the molded article can be subjected to humid conditions or water to promote at least some hydrolysis of the phosphite to provide at least some free tocotrienol.

When introducing elements of the aspects, embodiments and examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A composition comprising a blend of ultrahigh molecular weight polyethylene and a protected antioxidant comprising at least one of a protected tocopherol and a protected tocotrienol, the protected antioxidant comprising a phosphite protecting group.

2. The composition of claim 1, in which the blend comprises a substantially uniform distribution of the protected antioxidant throughout the ultrahigh molecular weight polyethylene.

3. The composition of claim 2, in which the protected antioxidant is present in an antioxidant mixture comprising the protected antioxidant and deprotected antioxidant, in which the antioxidant mixture has a substantially uniform distribution throughout the ultrahigh molecular weight polyethylene.

4. The composition of claim 1, further comprising an unprotected antioxidant.

5. The composition of claim 4, in which the protected antioxidant and the unprotected antioxidant comprise the same base antioxidant.

6. A method comprising:
   combining ultrahigh molecular weight polyethylene and a protected antioxidant comprising at least one of a protected tocopherol and a protected tocotrienol, the protected antioxidant comprising a phosphite protecting group; and
   exposing the combined ultrahigh molecular weight polyethylene and protected antioxidant to radiation to crosslink the ultrahigh molecular weight polyethylene.

7. The method of claim 6, further comprising converting at least some of the protected antioxidant to a deprotected antioxidant after the exposing step.

8. The method of claim 6, further comprising combining the ultrahigh molecular weight polyethylene and the protected antioxidant to provide a blend comprising a substantially uniform distribution of the protected antioxidant throughout the ultrahigh molecular weight polyethylene.

9. The method of claim 6, in which the exposing step comprises exposing the mixed ultrahigh molecular weight polyethylene and protected antioxidant to gamma radiation.

10. The method of claim 6, in which the exposing step comprises exposing the mixed ultrahigh molecular weight polyethylene and protected antioxidant to electron beam radiation.

11. The method of claim 6, further comprising consolidating the combined ultrahigh molecular weight polyethylene and antioxidant mixture prior to the exposing step.

12. The method of claim 6, further comprising consolidating the mixed ultrahigh molecular weight polyethylene and antioxidant mixture after the exposing step.

13. A method of facilitating production of an implant, the method comprising:
providing ultrahigh molecular weight polyethylene; and
providing a protected antioxidant comprising at least one of a protected tocopherol and a protected tocotrienol, the protected antioxidant comprising a phosphite protecting group.

* * * * *

UNITED STATES PATENT AND TRADEMARK OFFICE
CERTIFICATE OF CORRECTION

Page 1 of 3

PATENT NO. : 8,399,535 B2
APPLICATION NO. : 12/813401
DATED : March 19, 2013
INVENTOR(S) : Dirk Pletcher It is certified that error appears in the above-identified patent and that said Letters Patent is hereby corrected as shown below:

On the Title page, in column 1, under Item "(54) Title", line 1, and in the Specification, column 1, line 1, after "POLYMER", delete "[[S]]", therefor On the Title page, in column 2, Item (56) under "Other Publications", line 1-2, delete "International Search Report for PCT/EP2009/008250 dated Jan. 21, 2010." and insert --"International Application Serial No. PCT/EP2009/008250, International Search Report mailed Jan. 21, 2010".--, therefor On Title page 2, in column 1, Item (56) under "U.S. Patent Documents", line 72, delete "2007/0293646 A1 12/2007 Gosse et al." and insert --2007/0293647 12/2007 McKellop--, therefor On Title page 2, in column 2, Item (56) under "Other Publications", line 1-2, delete "Extended EP Search Report and Written Opinion for EP Application No. 10 01 2579 dated Dec. 9, 2010." and insert --"EP Application No. 10 01 2579, Extended EP Search Report and Written Opinion mailed Dec. 9, 2010".--, therefor On Title page 2, in column 2, Item (56) under "Other Publications", line 3-4, delete "Extended EP Search Report and Written Opinion for EP Application No. 10 01 2589 dated Dec. 9, 2010." and insert --"EP Application No. 10 01 2589, Extended EP Search Report and Written Opinion mailed Dec. 9, 2010"--, therefor On Title page 2, in column 2, Item (56) under "Other Publications", line 9, delete "Hosp.MGH" and insert --Hosp. MGH--, therefor On Title page 2, in column 2, Item (56) under "Other Publications", line 13, delete "Components",," and insert --Components",--, therefor On Title page 2, in column 2, Item (56) under "Other Publications", line 14, delete "Society,." and insert --Society,--, therefor Signed and Sealed this
Twenty-fifth Day of November, 2014

Michelle K. Lee
*Deputy Director of the United States Patent and Trademark Office*

CERTIFICATE OF CORRECTION (continued)
U.S. Pat. No. 8,399,535 B2

On Title page 2, in column 2, Item (56) under "Other Publications", line 14, after "2007", insert --,--, therefor On Title page 2, in column 2, Item (56) under "Other Publications", line 17, delete "Society." and insert --Society,--, therefor On Title page 2, in column 2, Item (56) under "Other Publications", line 19, delete "Pin-onDisk" and insert --Pin-on-Disk--, therefor On Title page 2, in column 2, Item (56) under "Other Publications", line 21, after "16", insert --,--, therefor On Title page 2, in column 2, Item (56) under "Other Publications", line 21, after "2001", insert --,--, therefor On Title page 2, in column 2, Item (56) under "Other Publications", line 23-24, delete "Written Opinion & Search Report for PCT/US2009/032412 dated Mar. 25, 2010." and insert --"International Application Serial No. PCT/US2009/032412, International Search Report and Written Opinion mailed Mar. 25, 2010".--, therefor On Title page 2, in column 2, Item (56) under "Other Publications", line 25-26, delete "Written Opinion & Search Report for PCT/US/2008/059909 dated Sep. 14, 2009." and insert --"International Application Serial No. PCT/US2008/059909, International Search Report and Written Opinion mailed Sep. 14, 2009".--, therefor On Title page 2, in column 2, Item (56) under "Other Publications", line 27-28, delete "Written Opinion & Search Report for PCT/EP2005/008967 dated Jun. 21, 2006." and insert --"International Application Serial No. PCT/EP2005/008967, International Search Report and Written Opinion mailed Jun. 21, 2006".--, therefor On Title page 2, in column 2, Item (56) under "Other Publications", line 30, delete "Resistance"," and insert --Resistance",--, therefor On Title page 2, in column 2, Item (56) under "Other Publications", line 32, delete "x" and insert --$\alpha$--, therefor On Title page 3, in column 1, Item (56) under "Other Publications", line 1, delete "X" and insert --$\alpha$--, therefor On Title page 3, in column 1, Item (56) under "Other Publications", line 3, delete "Perth" and insert --Parth--, therefor On Title page 3, in column 1, Item (56) under "Other Publications", line 3, delete "al" and insert --al.,--, therefor

CERTIFICATE OF CORRECTION (continued)
U.S. Pat. No. 8,399,535 B2

On Title page 3, in column 1, Item (56) under "Other Publications", line 6, delete "Jnrl" and insert --Journal--, therefor On Title page 3, in column 1, Item (56) under "Other Publications", line 6, delete "Science,vol. 13, 2002" and insert --Science, vol. 13, 2002,--, therefor On Title page 3, in column 1, Item (56) under "Other Publications", line 10, delete "at" and insert --et--, therefor On Title page 3, in column 1, Item (56) under "Other Publications", line 10, delete "x" and insert --α--, therefor On Title page 3, in column 1, Item (56) under "Other Publications", line 11, delete "y" and insert --γ--, therefor On Title page 3, in column 2, Item (56) under "Other Publications", line 8, delete "D," and insert --D.,--, therefor On Title page 3, in column 2, Item (56) under "Other Publications", line 16, delete "Filed" and insert --filed--, therefor